United States Patent [19]

Van As et al.

[11] Patent Number: 5,327,428
[45] Date of Patent: Jul. 5, 1994

[54] COLLISION-FREE INSERTION AND REMOVAL OF CIRCUIT-SWITCHED CHANNELS IN A PACKET-SWITCHED TRANSMISSION STRUCTURE

[75] Inventors: Harmen Van As, Langnau am Albis; Wolfram W. Lemppenau, Kilchberg; Erwin A. Zurfluh, Feldmeilen, all of Switzerland

[73] Assignee: International Business Machines Corporation, Armonk, N.Y.

[21] Appl. No.: 772,892

[22] Filed: Oct. 7, 1991

[30] Foreign Application Priority Data

Apr. 22, 1991 [EP] European Pat. Off. ........ 91810297.1

[51] Int. Cl.⁵ .................................................. H04J 3/24
[52] U.S. Cl. ...................................... 370/94.2; 370/60
[58] Field of Search ................. 370/94.2, 77, 60.1, 370/58.2, 82, 83, 84, 60, 94.1, 112

[56] References Cited

U.S. PATENT DOCUMENTS

| | | | |
|---|---|---|---|
| 4,638,476 | 1/1987 | Acampora et al. | 370/83 |
| 4,761,781 | 8/1988 | Calvignac et al. | 370/94.2 |
| 4,858,232 | 8/1989 | Diaz et al. | 370/86 |
| 4,893,306 | 1/1990 | Chao et al. | 370/94.2 |
| 4,933,934 | 6/1990 | Aikoh et al. | 370/112 |
| 4,970,719 | 11/1990 | Takase et al. | 370/112 |
| 5,153,578 | 10/1992 | Izawa et al. | 370/94.2 |
| 5,164,938 | 11/1992 | Jurkevich et al. | 370/94.2 |

FOREIGN PATENT DOCUMENTS

| | | | |
|---|---|---|---|
| 0343319 | 5/1988 | European Pat. Off. | H04L 11/16 |
| 2177878 | 7/1985 | United Kingdom | H04L 11/16 |

OTHER PUBLICATIONS

J. Y. Chao, W. T. Lee and L. Y. Kung, "A New Buffer Insertion Ring with Time Variant Priority Scheme to Facilitate Real-Time Image Transmission on a High Speed Integrated Local Area Network", 14th Conference on Local Computer Networks, Minneapolis, Oct. 1989.

Computer Networks & ISDN Systems, vol. 17, No. 3, Sep. 15, 1989, pp. 193-199.

Primary Examiner—Douglas W. Olms
Assistant Examiner—Shick Hom
Attorney, Agent, or Firm—Joscelyn G. Cockburn

[57] ABSTRACT

This invention relates to a method and system for a collision free insertion and removal of circuit-switched channels in a self-adaptive transmission data structure carrying different classes of packet-switched traffic on a slotted Local Area Network (LAN). This network may have bus or ring topology. The different classes of traffic are asynchronous traffic (packet-switched), synchronous traffic (packet-switched, time sensitive), isochronous traffic (circuit-switched), and signalling on demand. The inventive self-adaptive transmission data structure permits an economic, flexible and bandwidth efficient integration of these different classes of traffic.

18 Claims, 22 Drawing Sheets

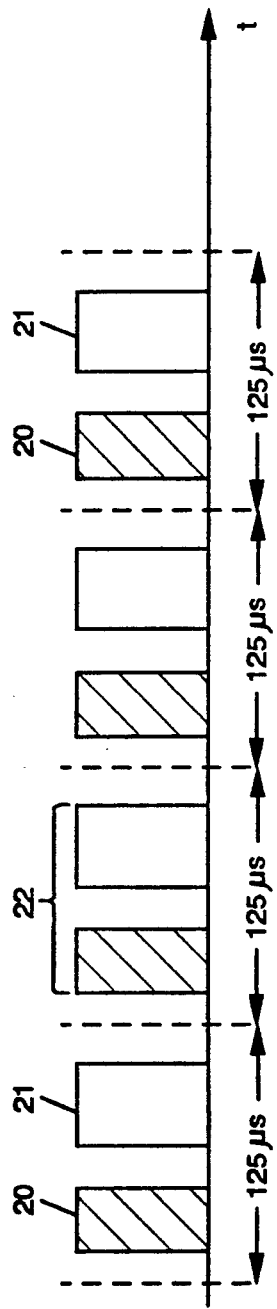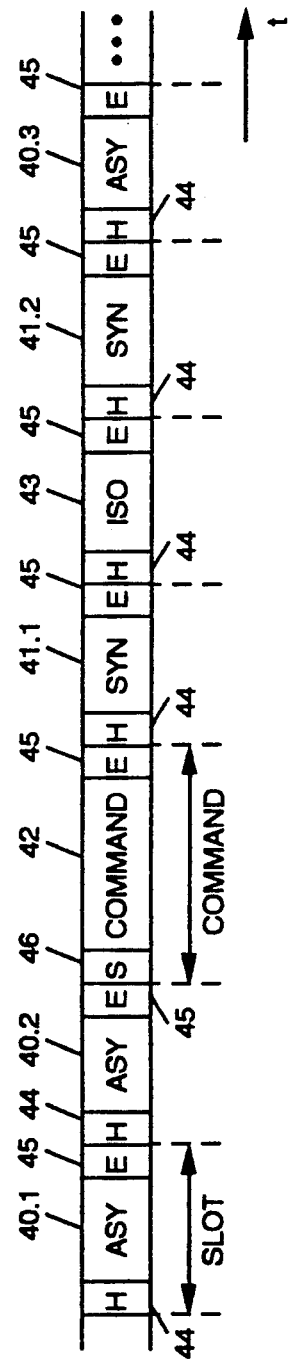

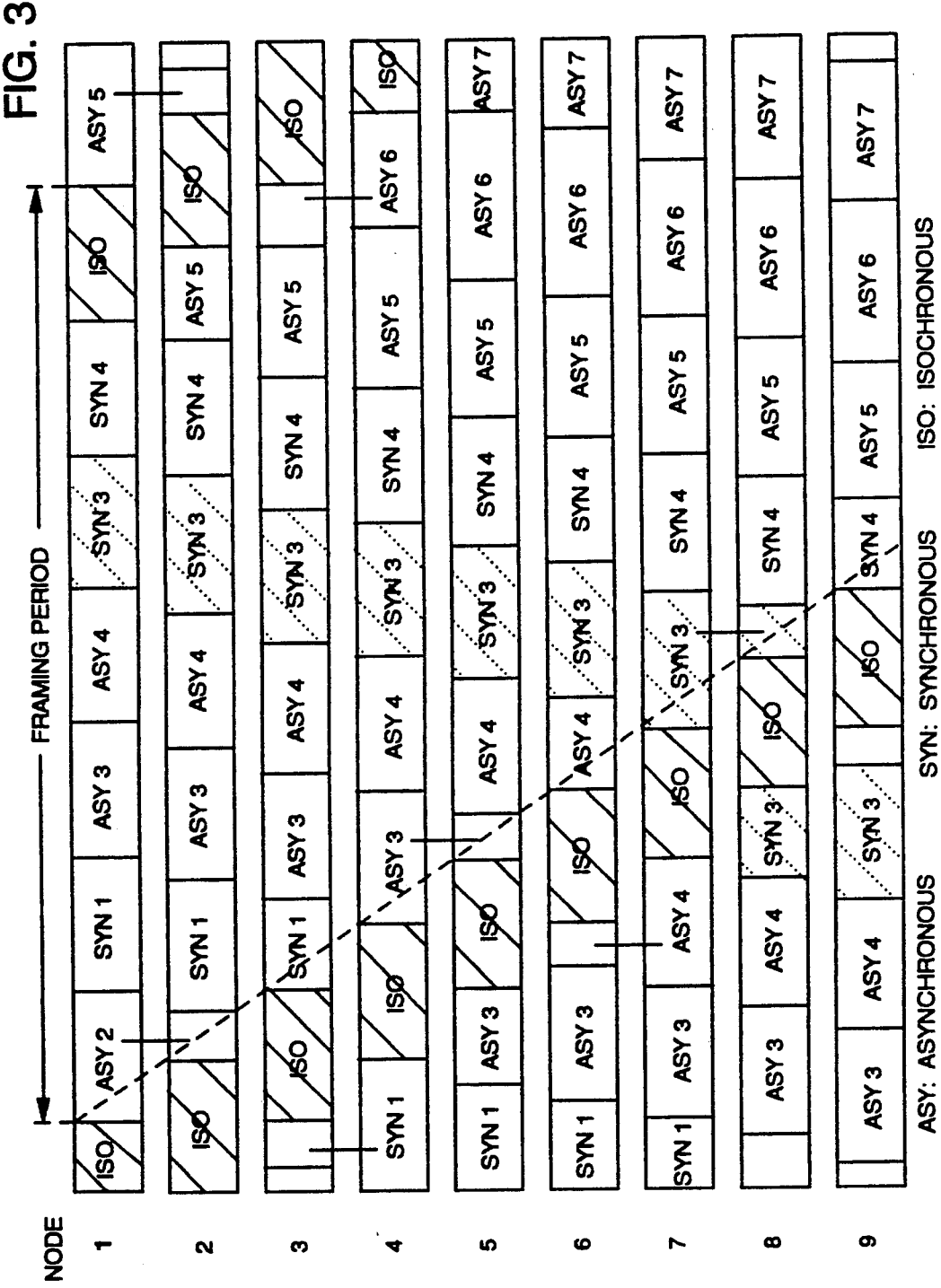

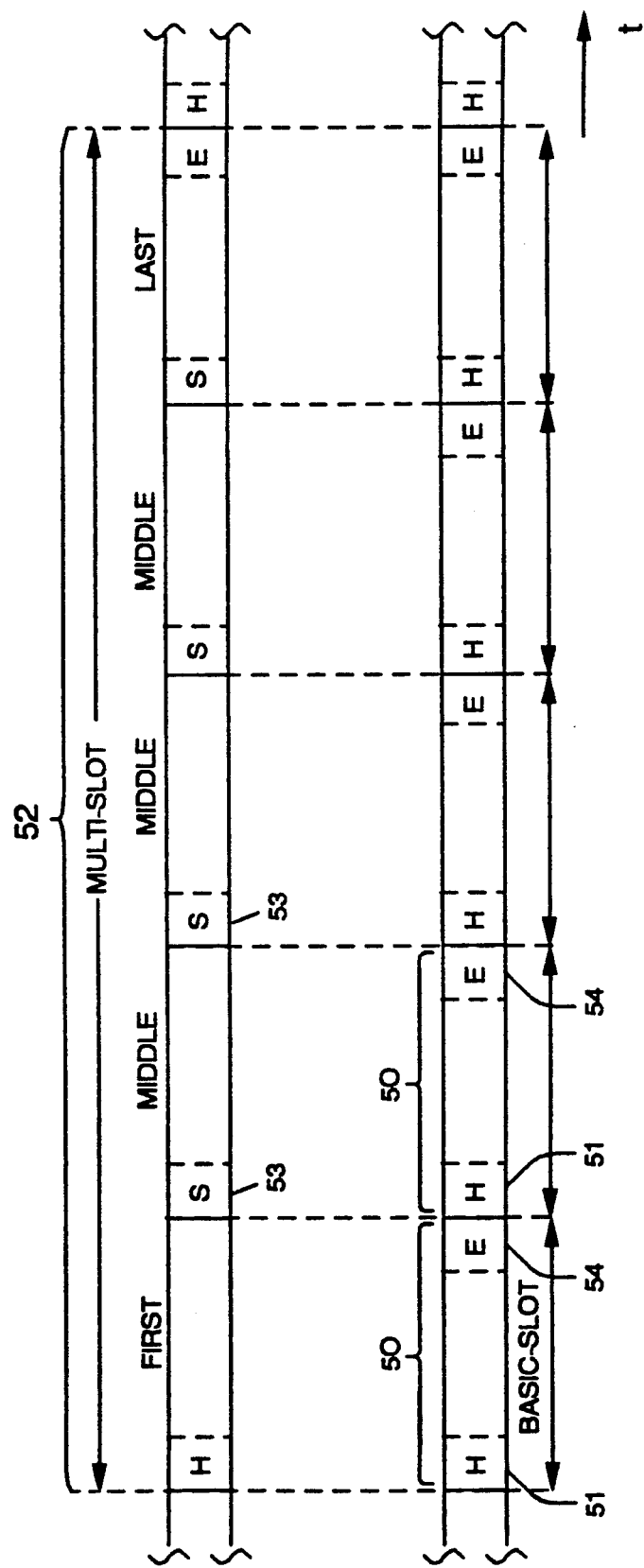

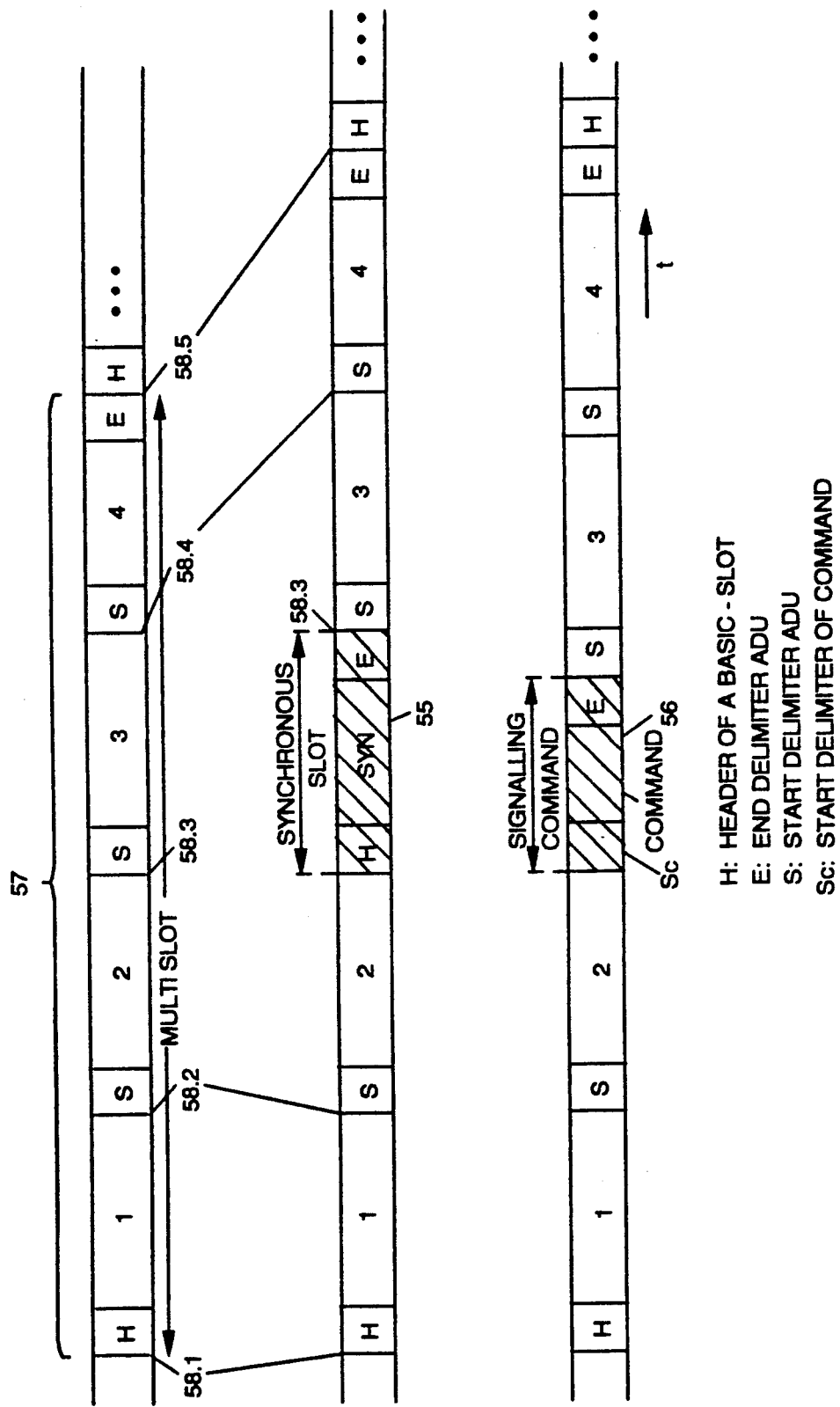

H: HEADER OF BASIC-SLOT

COLLISION-FREE INSERTION AND REMOVAL OF CIRCUIT-SWITCHED CHANNELS IN A PACKET-SWITCHED TRANSMISSION STRUCTURE

TECHNICAL FIELD

This invention relates to a method and system for a collision-free insertion and removal of circuit-switched channels in a self-adaptive transmission data structure carrying dominantly different classes of packet-switched traffic on a slotted LAN (Local Area Network) with a bus or ring topology. The addressed traffic integration comprises asynchronous traffic (packet-switched), synchronous traffic (packet-switched, time-sensitive), isochronous traffic (circuit-switched), and signalling on-demand.

BACKGROUND OF THE INVENTION

The rapid evolution in the field of information processing, data communication, and multi-media office communication has led to the emergence of transmitting different classes of traffic via the same medium, such as offered on LANs (Local Area Network). The majority of existing networks, whether circuit-switched or packet-switched, are still oriented towards particular applications. Thus, we usually have different networks for voice, signalling, video and data applications operating in parallel and independently. While each of these networks is suitable for the application it is designed for, they are not very efficient for supporting other applications. The advantages of an integrated communication system which can accommodate a variety of diverse services with different bandwidth requirements has been recognized for some time. The following two articles "Design approaches and performance criteria for integrated voice/data switching", of M. J. Ross, Proc. IEEE, Vol. 65, September 1977, pp. 1283-1295, and "Plan today for tomorrow data/voice nets", of H. Frank, Data Communications, September 1978, pp. 51-62, relate already to the integration of different traffic classes. The objective of having a unified integrated network allowing the transmission of different traffic classes is the flexibility to cover existing as well as future services with good performance and economical resource utilization, and with a unified network management, operation and maintenance.

In the following sections, we describe the current approaches to integrate circuit-switched and packet-switched principles on LANs. With regard to the prevalent trend in the design of LANs and the unknown future traffic characteristics, we then formulate the objects for the self-adaptive transmission data structure and method of the present invention.

Already in the early seventies, publications dealt with the integration of circuit-switched and packet-switched principles on the same transmission medium. Publications started with an integration on point-to-point links, as described in the article of K. Kümmerle, "Multiplexer Performance of Integrated Line- and Packet-Switched Traffic", 2nd Intern. Conf. on Computer Communications (ICCC), Stockholm, 1974, pp. 507-515. Afterwards the efforts were extended to LANs as well as High-Speed LANs (HSLANs), and switching nodes with an internal bus structure. Examples representative for the large number of publications relating to these efforts are:

D. Roffinella, C. Trinchero, G. Freschi, "Interworking Solutions for a Two-Level Integrated Services Local Area Network", IEEE J. on Sel. Areas in Comm., Vol. SAC-5, No. 9, 1987, pp. 1444-1453;

J. H. M. Kleinen, "PHILAN: An Integrated Local Area Network for High Speed Applications", EFOC/LAN 86, Amsterdam, June 1986, pp. 83-87;

R. Calvo, M. Teener, "FDDI-II Architectural and Implementation Examples", EFOC/LAN 90, Munich, June 1990, pp. 76-86.

The current trend in the design of new LANs is to attach more users, to carry higher traffic rates, to achieve smaller delays, to integrate more services, and to cover larger geographical areas. To permit this wide variety of objectives, the evolving high-speed LANs must have concurrent access and slot reuse capability, must provide for frame-by-frame as well as cell-by-cell transmission, and must be able to handle circuit-switched services, too.

The suitable transmission data-structures are slotted to allow simultaneous medium access by geographically separated nodes. Because of this, LAN throughput does not degrade for increasing product of speed and distance. Destination removal (allowing slot reuse) has the high potential to increase system throughput significantly beyond the bit rate of the transmission medium. In today's LANs, transmission is via frames in contiguous slots. This avoids segmentation (thus, no labeling algorithm is necessary to identify segments), reduces transmission overhead, and receiver hardware becomes less complex and its buffer size can be kept smaller. Moreover, transmission by frames simplifies buffer management of multiple receiver buffers at high data rates significantly. At the other hand, transmission of ATM (Asynchronous Transfer Mode) cells is extensively promoted as solution for Broadband-Integrated Services Digital Network (B-ISDN). Moreover, for the foreseeable future, the demand for circuit-switched channels (video, PBX interconnection) on high-speed LANs becomes increasingly evident.

In slotted LANs, frames are guaranteed to be transmitted in contiguous slots either by pure reservation, as described in the publications of M. Nassehi, "CRMA: An Access Scheme for High-Speed LANs and MANs," IEEE International Conference on Communications, Atlanta, Ga., April 1990, pp. 1697-1702, and "Cyclic Reservation Multiple-Access Scheme for Gbit/s LANs and MANs based on Dual-Bus Configuration," Eighth European Fibre Optic and Local Area Networks Conference, EFOC/LAN, Munich, June 1990, pp. 246-251, or by using the buffer insertion technique as e.g. disclosed in the following European patent applications:

"Broadband Ring Communication System and Access Control Method", Application No.: 90810456.5, "Medium Access Technique for LAN Systems", Application No.: 91810224.5.

Recently, buffer insertion LANs have been augmented by providing a by-pass mechanism for the so-called synchronous slots, as for example described in the above named European patent applications 90810456.5 and 91810224.5. In this way, real-time response for time-sensitive connections is not affected by insertion buffer delays. This by-pass mechanism is a component of the described transmission data-structure. Additionally, fairness in insertion-buffer LANs is now manageable either by a credit mechanism, described in the European patent application 91810224.5, or by a reservation mechanism described in the European patent application 90810456.5.

Traffic types

In the following, we will denote circuit-switched channels by isochronous channels. Slots used for that purpose obey strict periodicity. Slots carrying traffic according to the packed-switched principle is differentiated in synchronous and asynchronous. Synchronous slots are used for time-sensitive connections like packetized voice and video or other real-time applications. These connections may need a play-out buffer to adjust network delay variations. All other traffic is transported by asynchronous slots. Essentially, the three traffic types differ in the variation of the end-to-end delay. Isochronous traffic exhibits a constant delay and thus its delay variation is zero. The delay variation for synchronous traffic varies within a limited range whereas that for asynchronous traffic can be considerably. In addition to these three traffic types, signalling traffic for network housekeeping functions (like monitoring, measurements, slot reservations, as disclosed in the European patent application 91810224.5, "Medium Access Technique for LAN Systems", congestion control, and in general network management) must be taken into consideration, too.

Requirement to adapt to continuously changing traffic characteristics

Most LANs are designed to perform at their best for a particular type of traffic, but become less efficient in an environment with strongly different traffic characteristics. As a very simple example, it has been shown that for long frames token rings perform considerably better than slotted rings (comparison without slot reuse), whereas for short messages this is reverse. Because of continuously changing traffic characteristics and the unknown mix of future traffic in B-ISDN, it is essential to have a transmission data-structure that naturally adapts to different and continuously changing traffic characteristics.

Conventional integration of circuit and packet switching on LANs

The integration of circuit switching (CS) and packet switching (PS) on the same medium of a LAN is based on a periodic framing period of constant length (e.g. 125 μs). Framing organization may be partitioned (fixed boundary or movable boundary) with a slotted CS-region and an unstructured PS-region, or completely slotted with free allocation of CS-connections. In the latter approach, a PS-frame is either contiguously transmitted in the remaining slots or is transmitted by autonomous segments with address information (e.g. ATM cells). An extensive overview of these methods is described in the article of E.-H. Göldner, "An Integrated Circuit/Packet Switching Local Area Network—Performance Analysis and Comparison of Strategies", Computer Networks and ISDN Systems, Vol. 10, No. 3–4, October/November 1985, pp. 211–219.

A disadvantage of a framing period with a fixed boundary, where the bandwidth is separated in two fixed parts, is that the bandwidth cannot be shared when traffic demand changes dynamically. In systems using a framing period with a movable boundary, the size of the isochronous part is determined by the position of the last isochronous channel before the packet-switched part starts. Bandwidth of free isochronous channels lying before the last channel cannot be used without channel rearrangement. Channel rearrangement on a ring needs a considerable overhead in terms of organization and higher-layer communication to assure synchronization of all involved nodes as disclosed in the European patent 227852, "Local Area Communication System for Integrated Services Based on a Token-Ring Transmission Medium". Moving the boundary itself requires a similar overhead. Then, all nodes must be informed about the new position. On a ring, moving must be done in several steps to assure that no data is lost. First the nodes must be informed, then all nodes must confirm, and finally in a next round the new position of the CS/PS-boundary circuit-switched/packet-switched) becomes effective. Thus, also a considerable delay is involved.

In the other two approaches with a completely slotted framing period, slots for isochronous channels can be arbitrarily allocated. Slots have a flag indicating the traffic type, so that a frame can be transmitted in an interleaved manner between the isochronous channels. In the first approach, segments are variable and carry no addresses. In the second approach, segments are constant and have address information. Here, the segments or cells are autonomous, and thus parts of different frames can be transmitted interleaved, too. Bandwidth adapts optimally to traffic demand, but on a ring LAN establishment and release of isochronous channels encounter a similar problem as in the framing organization with a moveable boundary i.e. slots to be allocated for an isochronous channel must first be marked as reserved. Thereafter, they get allocated in the next roundtrip. Additionally, the nodes involved must be informed when the channel is available.

In FIG. 1, we highlight already the main difference between isochronous channel support via a movable boundary (left side of figure) and that via insert/remove self-adaption (right side) as is an integrated part of the inventive transmission data-structure. Initially, a framing period 1 exists with two isochronous channels CH1 and CH2. In the movable boundary approach, both channels are located at the begin of the framing period 10 (CS-region). The remaining part of the framing period 10 (PS-part) is used for asynchronous traffic. The first two positions of the framing period 10 are denoted by 11.1 through 11.5 and 12.1 through 12.5 to differentiate between the five considered time instants. Initially, locations 11.1 and 12.1 are used by isochronous channels CH1 and CH2, respectively. As CH1 terminates, location 11.2 becomes free but cannot be used by asynchronous traffic until CH2 is rearranged from location 12.3 to 11.3 and until boundary 13 is correspondingly moved. As mentioned before, these actions cause communication overhead and delayed usage of the freed bandwidth. When later on another isochronous channel has to be established, boundary 13 is moved so that location 12.4 becomes free. It must be noticed that the boundary 13 cannot be moved immediately, because it must be ensured that location 12.4 does not carry data. Finally, after some communication overhead, the new channel CH3 is available at the location 12.5. Compared with this mode of operation, the insert/remove self-adaptation approach to establish and release isochronous channels is extremely efficient. First, both channels can principally be located at arbitrarily positions. We denote the location of channel CH1 by 14.1 through 14.2, and that of channel CH2 by 15.1 through 15.3. Initially, two isochronous channels are located 14.1 and 15.1. All bandwidth around them is available for asynchronous traffic. When CH1 terminates, its bandwidth at location 14.2 becomes immediately available, i.e.

without any delay and without communication overhead. In case that isochronous channel CH3 is to be allocated, it can be put anywhere in the framing period (here location 16.3). The key point here is that the channel is immediately available and needs (apart of course from the normal higher-layer set-up procedure) no extra communication overhead. This immediate allocation is possible by inserting the isochronous at the right location and by immediate or delayed removal of a corresponding number of asynchronous slots. Thus, generation of isochronous slots for the allocation of a new isochronous channel is accompanied by destroying free asynchronous slots whereby a temporary surplus of slots may occur when all asynchronous slot candidates are busy. At the other hand, releasing an isochronous channel causes a similar but opposite operation to be executed. This means, a now instantaneous removal of isochronous slots with simultaneous generation of asynchronous slots.

With respect to transmission robustness, the approaches with stricted slotted framing periods have the following drawback. Since only the begin of the framing period is used for synchronization, the recognition of individual slot boundaries relies only on counting. A synchronization loss can only be recovered at the begin of the next framing structure. During the elapsed time, secondary errors might be produced which require a complex recovery scheme to resolve them.

The nearest prior art for the present invention is given by the article of J. Y. Chao, W. T. Lee, L. Y. Kung, "A New Buffer Insertion Ring with Time Variant Priority Scheme to Facilitate Real-Time Image Transmission on a High Speed Integrated Local Area Network", 14th Conference on Local Computer Networks, Minneapolis, October, 1989, and the above named European patent application 90810456.5, "Broadband Ring Communication System and Access Control Method".

The objects of the inventive self-adaptive transmission method for slotted LANs, and the hardware implementation thereof, are given below.

SUMMARY OF THE INVENTION

Central objects of the present invention are to provide for immediate slot assignment for isochronous channels without interference with other traffic types, isochronous slots (with strict periodicity) that are allowed to drift through other transmission entities, and isochronous channels that can be temporarily deactivated and that are immediately reactivated by the nodes themselves (i.e. isochronous slots are immediately created by those nodes).

It is a further object to provide for a self-adaptive transmission method leading to minimal transmission overhead, maximum bandwidth efficiency, and optimal sharing between different traffic types (isochronous, synchronous, asynchronous, and signalling).

Another object of the present invention is a method which provides for support of dynamic signalling with on-demand bandwidth allocation.

It is a further object to provide for autonomous slot concatenation (up to a selected bound of slot units) which exists only during transmission of single frames.

It is another object of the present invention is to provide for transmission robustness.

It is another object of the present invention to provide a transmission method with default oriented or user programmable selection of slot-unit size and isochronous framing period at start-up time.

It is a further object to provide a hardware implementation according to the inventive transmission method.

The invention as claimed is intended to meet these objectives and to remedy the remaining deficiencies of known methods and systems for integrated transmission on slotted LANs. In the inventive method and system, this is accomplished in that the transmission autonomously adapts to the current demand by dynamic housekeeping of so-called Atomic Data Units (described later on) which forms the transmission entities for the different classes of traffic. These classes of traffic are handled according to their synchronization and delay requirements such that circuit-switched (e.g. isochronous) and packet-switched (e.g. asynchronous, synchronous) can be transmitted in a dynamic interleaved form.

This method is flexible, adapts autonomously to the instantaneously best transmission efficiency, is robust, and naturally decouples the transmission of four traffic types: isochronous, synchronous, asynchronous, and signalling.

| ABBREVIATIONS AND CONVENTIONS | |
|---|---|
| General | |
| LAN | Local Area Network |
| HSLAN | High-Speed Local Area Network |
| B-ISDN | Broadband Integrated Services Digital Network |
| ATM | Asynchronous Transfer Mode |
| MAC | Medium Access Control |
| CS | Circuit Switching |
| PS | Packet Switching |
| CRMA | Cyclic-Reservation Multiple-Access |
| C-CRMA | Checkpoint-CRMA |
| DQDB | Distributed Queue Dual Bus (IEEE 802.6) |
| FDDI | Fiber Distributed Data Interface (ANSI X3T9.5) |
| Hardware | |
| ADU | Atomic Data Unit |
| CMOS | Complementary Metal Oxide Semiconductor |
| CTRL | Control |
| FSM | Finite State Machine |
| FIFO | First-In First-Out |
| PHY | Physical |
| RX | Receiver |
| TX | Transmitter |
| SYN | Synchronous |
| ASY | Asynchronous |
| ISO | Isochronous |
| Conventions | |
| Source node | Node marking slot busy to carry payload |
| Destination node | Node copying slot payload |
| Removal node | Node making slot free |
| Basic-slot | Slot unit size |
| Multi-slot | Concatenation of contiguous basic-slots during frame transmission or during isochronous channel connection |
| Asynchronous slot | Basic-slot for asynchronous transmission service: normal data traffic, large variation in end-to-end delay |
| Synchronous slot | Basic-slot for synchronous transmission service: time-sensitive connections like packetized voice and video, small variation in end-to-end delay asynchronous slot by-pass capability |
| Isochronous slot | Basic-slot for isochronous transmission service: pure circuit-switched traffic, constant end-to-end delay, asynchronous/synchronous slot or signalling command preemption capability |
| Framing period | Strict periodic time interval for |

-continued

| ABBREVIATIONS AND CONVENTIONS |
|---|
| isochronous channels (e.g. 125 μs) |

DESCRIPTION OF THE DRAWINGS

The invention is described in detail below with reference to the following drawings.

FIG. 2 shows a stiff circuit-switching data-infrastructure;

FIG. 3 shows an elastic packet-switching data-infrastructure;

FIG. 4 shows a sequence of embedded autonomous slot units (Basic slots);

FIG. 5 shows a concatenation of contiguous basic-slots into a multi-slot;

FIG. 6 shows an asynchronous multi-slot with by-passing synchronous slot and signalling command;

GENERAL DESCRIPTION

Figure 1:
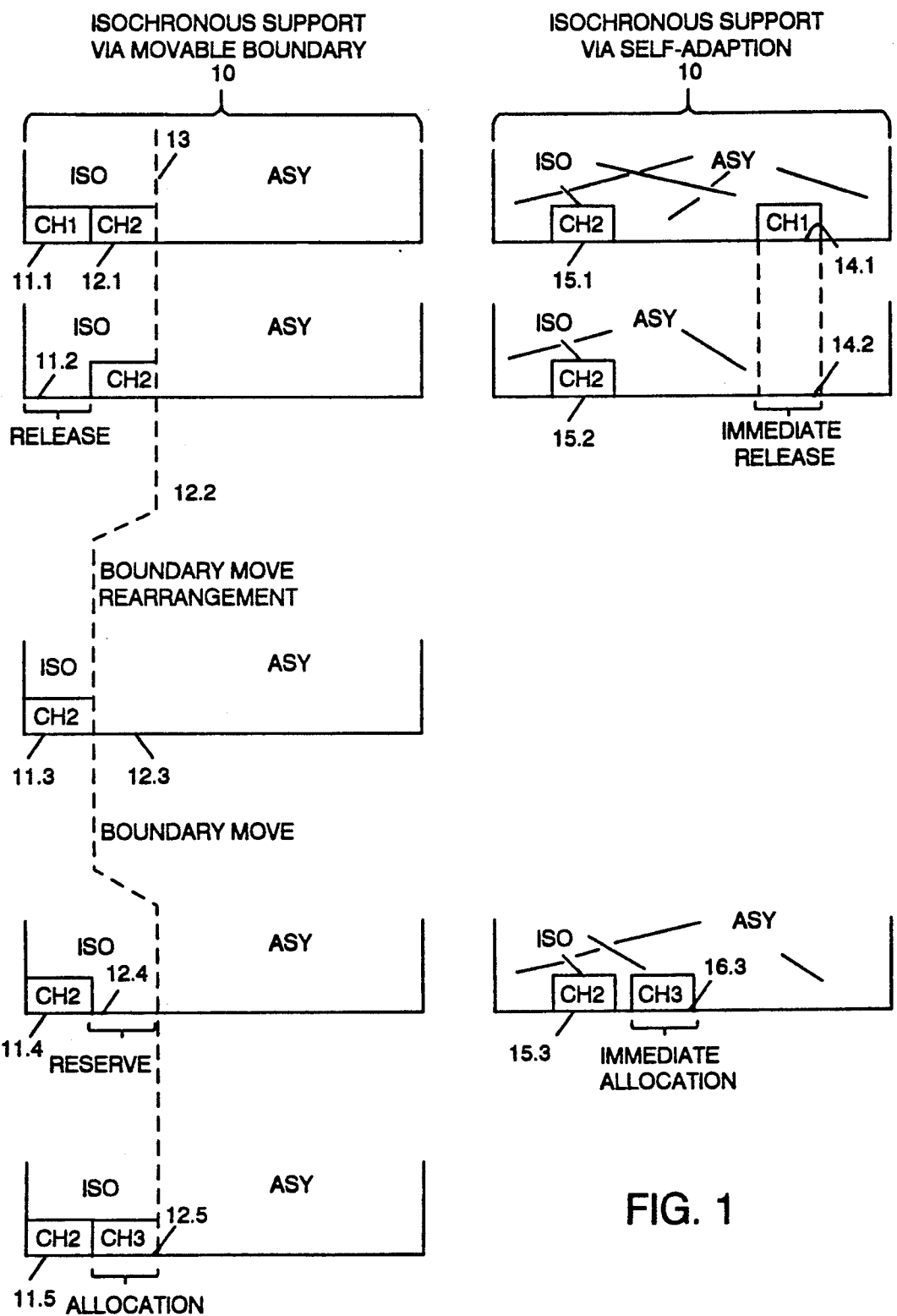
FIG. 1 shows the main differences between the conventional isochronous channel (circuit-switched) support via a movable boundary and that via insert/remove self-adaption according to the present invention.

Before going into details, we describe in this section the operating environment, the basic ideas, the principal implementation structure, and the self-adaptive capabilities of this transmission data-structure. It is called self-adaptive, because the transmission data-structure naturally adapts towards optimal utilization.

Network topologies

The described inventive transmission data-structure is valid for point-to-point links as well as for bus and ring topologies. On a point-to-point link and on a bus, there exists a clean slot flow: at the begin of the transmission medium (e.g. bus header) free slots are generated and at its end-point the slots (busy or free) are destroyed. On a ring, the slots circulate. Thus, owing to the wrap around, a ring scheduler (monitor, bandwidth manager) must deal with both free and busy slots. This complicates slot handling and the CS/PS integration significantly. Thus, by describing the transmission data-structure for a ring, the cases for a bus and a point-to-point link are automatically covered as a simpler topology.

Asynchronous transmission service

An asynchronous transmission service is provided by asynchronous slots. This is a packet-switched service and provides a data service as it is commonly used today to transmit all kinds of data traffic ranging from short messages to large data quantities. In the transmission hierarchy as explained below, the asynchronous slots obtain no transmission favors.

Synchronous transmission service

The synchronous transmission service is also a packet-switched service, but it makes use of synchronous slots. These slots receive an expedited transmission treatment in that all synchronous slots can by-pass asynchronous slots being delayed by a buffer in the transmission path. This holds both for the elastic buffer in the scheduler and insertion buffers in the nodes. The latter ones are only present in buffer insertion LANs. Only complete slots can be by-passed. Thus, asynchronous slots are not preempted by synchronous slots. Synchronous slots are introduced to meet time-sensitive traffic requirements for services like packetized voice and video when operated on a buffer-insertion LAN.

Isochronous transmission service

The isochronous transmission service is a pure circuit-switched service. The corresponding slots are the isochronous slots which can be transmitted at any time within the transmission data-structure. Thus, they are allowed to preempt both synchronous and asynchronous slots as well as signalling commands or messages. By this, isochronous slots follow strict timing rules.

Signalling

The inventive data transmission method and data structure fully supports dynamic signalling with on-demand allocation of bandwidth as has been proposed in the European patent application 91810222.9, "Insert-/Remove Signalling In LAN Systems". Thus, signalling commands or messages are not bound to entire slot sizes and they vary with current signalling need. Furthermore, signalling commands, messages or information's are inserted into the data path by using the buffer insertion technique. We propose to handle signalling traffic as a synchronous transmission service. Thus, signalling commands or messages can by-pass asynchronous slots being delayed by a buffer in the transmission path. By-passing of asynchronous slots is only on slot boundaries. Important applications of this dynamic signalling method are the reservation process in Checkpoint-CRMA (C-CRMA), European patent application 91810224.5, "Medium Access Technique For LAN Systems", and congestion control to prevent (or reduce) receiver buffer overflow in adapters, routers and bridges as later on described in this patent application. Signalling can principally belong to the asynchronous and the synchronous transmission service. The choice depends on the application.

Multiplexing modes

As described in the European patent application 91810224.5, "Medium Access Technique For LAN Systems", the so-called second generation CRMA versions can be operated in three modes: pure, cell, and insertion multiplexing. Pure multiplexing allows both cell-by-cell and frame-by-frame transmissions whereby for the latter slot contiguity is provided by the reservation process. Immediate access and slot reuse can be applied restrictively. In the cell multiplexing mode, all transmissions only take place in autonomous entities (ATM mode of operation). Immediate access and slot reuse can fully be exploited. Finally, insertion multiplexing permits the transmission of cells or complete frames, immediate access and slot reuse in a natural way by insertion buffers in the nodes.

In the cases of pure and cell multiplexing, synchronous slots and signalling commands follow the same data path as the asynchronous slots. Then, only insertion multiplexing has the capability to temporarily hold back asynchronous slots when a node currently transmits a frame. Thus only in insertion LANs, synchronous slots get an express service because of by-passing. In all three multiplexing modes, however, insertion buffers or registers are present owing to dynamic signalling with information insertion. When the buffers are used only for that purpose, they can be implemented as registers which are more suited for very high data rates than dual ported buffers (speed gain of two).

Transmission data-structure

The transmission data-structure is based on two overlaying data-infrastructures each consisting of constant-size slot units denoted as basic-slots. The size of the basic-slots in each data-infrastructure can be chosen identical or not. The so-called circuit-switching data-infrastructure that binds the isochronous slots in strict periodicity is very stiff. FIG. 2 shows the fixed positions of two isochronous channels 20, 21 within framing periods 22 of e.g. 125 $\mu$s. Within the remaining transmission bandwidth, slots belonging to the second data-infrastructure can flow loosely such that they are not bound to fixed positions. Additionally, this so-called packet-switching data-infrastructure allows elasticity between basic-slots carrying synchronous and asynchronous traffic. The varying distance between basic-slots is at the one hand caused by dynamic signalling with on-demand bandwidth allocation, see European patent application 91810222.0, "Insert/Remove Signalling in LAN Systems", and at the other hand by stuffing when decentralized clocking, as described in the European patent application 90810456.5, "Broadband Ring Communication System and Access Control Method", is used. Under specific conditions both data-infrastructures can temporarily coincide when they are based on identical basic-slot sizes. In general, however, isochronous slots will drift through the synchronous and asynchronous slots as well as through the signalling commands. The drift is sometimes forward sometimes backward. It is for instance forward when in C-CRMA, as described in the European patent application 91810224.5, "Medium Access Technique For LAN Systems", a reserve command grows during the collection of reservation requests. It is backward when the corresponding confirm command shrinks as it passes the nodes during the confirmation phase. In FIG. 3, the loose flow of asynchronous (ASY) and synchronous (SYN) slots around a fixed positioned isochronous slot (ISO, circuit-switched) is illustrated.

Embedded autonomous slot units (basic-slots)

Basic-slots are handled as completely autonomous entities by embedding each slot between a Start-Delimiter and an End-Delimiter. Additionally, these delimiters carry a traffic-type identification. While embedding is absolutely required in a flexible and self-adaptive transmission data-structure, it has also advantages in conventional approaches. Then, embedding allows a clean synchronization on slot boundaries as well as an immediate and robust error recovery scheme. This is because a node has an a-priori knowledge about the valid sequences of Start and End-Delimiters, so that an error case is immediately recognized. Thus, an instantaneous action can be taken to prevent secondary effects. This possibility makes error recovery less complex and more robust. This becomes increasingly more important as transmission speed continues to grow. FIG. 4 shows a sequence of basic-slots 40.1–40.3, 41.1, 41.2, and 43 belonging to different traffic types (ASY, SYN, ISO) as well as a signalling command 42 (COMMAND). Each of them is embedded by a Start 44 or 46 (S or H) and End-Delimiter 45 (E), so that they become completely autonomous entities.

Atomic Data Units (ADUs)

The common unit in both transmission data-infrastructures is a so-called Atomic Data Unit (ADU). It size depends on the processing units in the hardware (e.g. 16, 32, 48, 64 bits). In the following, we base our description and embodiments on 32-bit ADUs which is currently an appropriate unit allowing usage of economic CMOS technology at 2.4 Gb/s transmission speed. Although not necessary for the described self-adaptive transmission data-structure, we assume 8B/10B coding on the medium, as disclosed in the European patent application, 90810614.9, "Coding Method and Apparatus for Pipelined and Parallel Processing". Four codewords on the transmission medium can be mapped into a 4-byte ADU in hardware and vice versa. The so-called ninth bit of an 8-bit unit is required as control line for the coding mechanism as disclosed in the European patent application, 90810614.9, "Coding Method and Apparatus for Pipelined and Parallel Processing".

Transmission entities: basic-slots and multi-slots

In LANs, it is advantageous to have the property of transmitting frames into contiguous slots, so that segmentation is avoided. Buffer-insertion LANs for instance allow this kind of transmission in a natural manner. When we are able to transmit in contiguous slots, the next step should be to eliminate superfluous overhead during the transmission of that frame. Therefore apart from transmissions in basic-slots, contiguous slots can be concatenated to form a multi-slot. In FIG. 5, this concatenation is shown. The lower part of the figure shows the individual basic-slots 50. The header 51 (H) consists (as we see later on in detail) of a Start-Delimiter-ADU and a Data-ADU containing physical addressing information. The upper part shows the concatenation into a multi-slot 52 where the intermediate headers 51 (H) have been reduced to the Start-Delimiter-ADU denoted by 53 (S). Additionally, intermediate End-delimiters denoted by 54 (E) have been eliminated. As indicated in the figure, the individual basic-slots 50 forming the multi-slot 52 are marked as first, middle or last. In this way, the payload part can be treated properly because length or position of the payload depends now on first, middle and last indication which is carried in the Start-Delimiter-ADUs. Furthermore, this makes the transmission more robust since some sequence information is available. With the Start-Delimiter-ADUs, the boundaries of the individual basic-slots remain available. Thus, this skeleton improves transmission robustness, facilitates later subdivision into basic-slots, and guarantees proper by-passing of synchronous slots 55 (or signalling commands 56) on internal boundaries 58.1-58.5 of an asynchronous multi-slot 57, as illustrated in FIG. 6.

Transmission entities: signalling commands or messages

Signalling commands or messages are of variable length. Additionally, their length may increase or decrease as it passes the nodes (Reserve and Confirm commands in C-CRMA European patent application 91810224.5). This mode of operation is possible, even at multi-Gigabit speed, by the regular ADU structure. The variable transmission entities for signalling start with a header H (consisting of a Start-Delimiter-ADU and a Data-ADU containing physical addressing information) and terminate with an End-Delimiter-ADU. The number of Data-ADUs (payload) in between vary.

Dynamic creation of multi-slots

Figure 7:
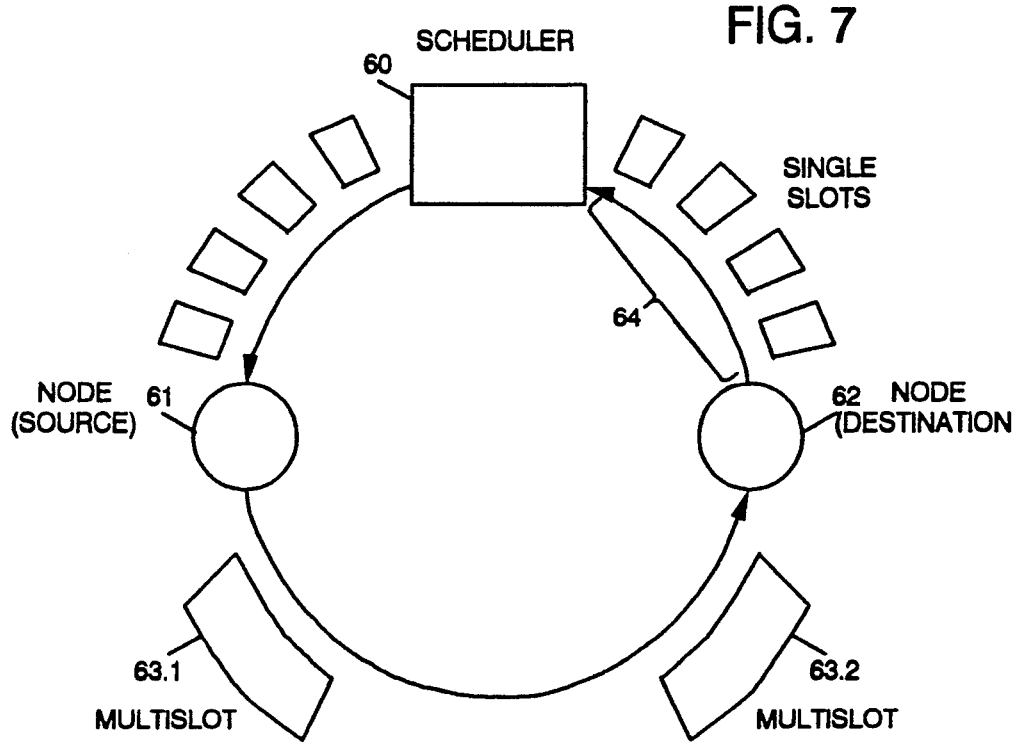
FIG. 7 shows a dynamic conversion between multi-slot and basic-slots.

In the following, the term slot or single slot is identical to a basic-slot. Multi-slots can be created for all three slot types. Asynchronous and synchronous multi-slots 63.1, 63.2 are dynamically created at a source node 61 and are divided again to basic-slots 64 (single slots) at the destination node 62 that frees the multi-slots 63.1, 63.2 (removal node), as shown in FIG. 7. In the case of broadcasting, the removal node is the source node 61. The multi-slots for isochronous channels are normally created and split by the scheduler 60. However, as we will see later (section: deactivation/activation of an isochronous channel), a node can temporarily deactivate its isochronous channel by destroying an isochronous slot (and simultaneously generation of an asynchronous slot). For channel activation, the node does the reverse. An isochronous multi-slot is converted accordingly.

Clock synchronization

The operation of the described transmission datastructure is independent from the method used for the derivation of the system clock. In case of decentralized clocking, the scheduler must provide enough Stuffing-ADUs so that nodes can equalize their clock by removing or inserting Stuffing-ADUs (details see: European patent application 90810456.5). Stuffing can be done either exclusively between End and Start-Delimiters of two consecutive slots or equally spread over time which means arbitrarily within slots (but on ADU boundaries). For centralized clocking, no Stuffing-ADUs are required because clocks in the individual nodes are completely coupled with the master clock. In the centralized solution, more ADUs are available for payload transmission. The clock for the isochronous channels is in both solutions provided by a periodic Isochronous-Clock-ADU. The interval (framing period) can be chosen freely. In case of voice transmissions, the framing period would be 125 μs.

Hierarchical organization of the elastic buffer in the scheduler

Figure 8:
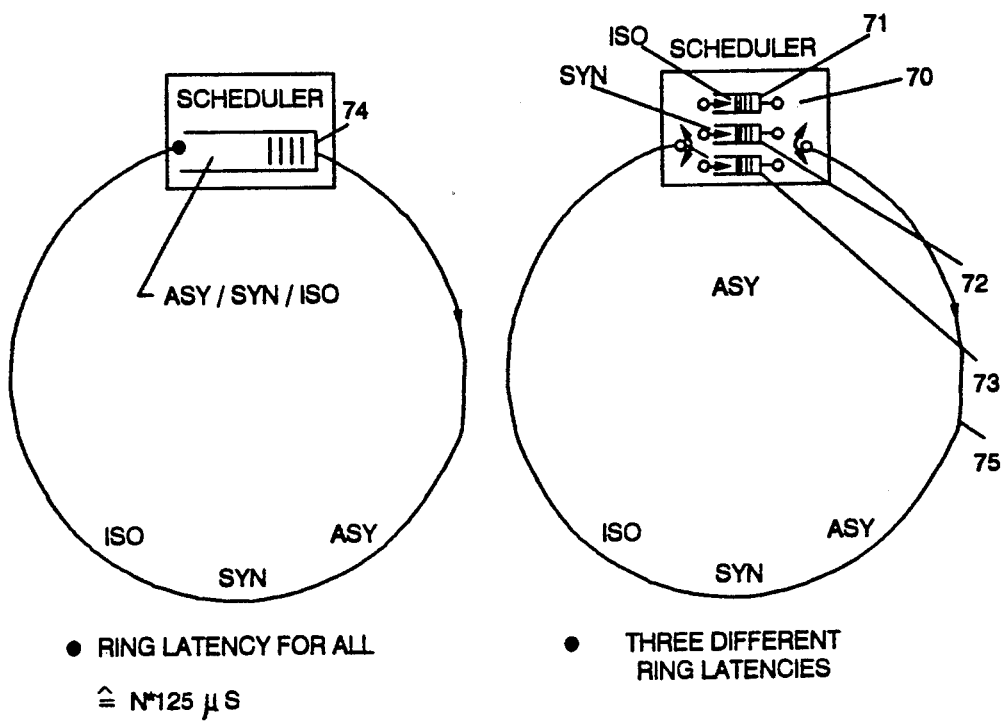
FIG. 8 shows a hierarchical organization of the elastic buffer in the scheduler.

In contrast of having one common elastic buffer 74, the elastic buffer 71, 72, 73 in the present scheduler 70 is not a mere FIFO structure, but is hierarchically organized as shown in FIG. 8. This is a key point because of the following reasons. For isochronous channels, we need strict periodicity and therefore an integer number of framing periods must be present in the network, either on the ring 75 or in the elastic buffer 71-73. For an 125 μs framing period, this means that the network latency increases in steps of 125 μs which equates to steps of 25 km. Although this large granularity is mandatory for isochronous channels, it creates an absolutely unnecessary delay for the other two traffic types. With the hierarchical organization, asynchronous and synchronous slots can by-pass the isochronous slots which must be delayed because of the periodicity requirement. Thus, the by-passing slots do not experience the framing period delay. Furthermore, the separation of the different slot types into three independent elastic buffers 71, 72, and 73, as shown in FIG. 8, is essential to control them freely.

Three different ring latencies

Figure 9:
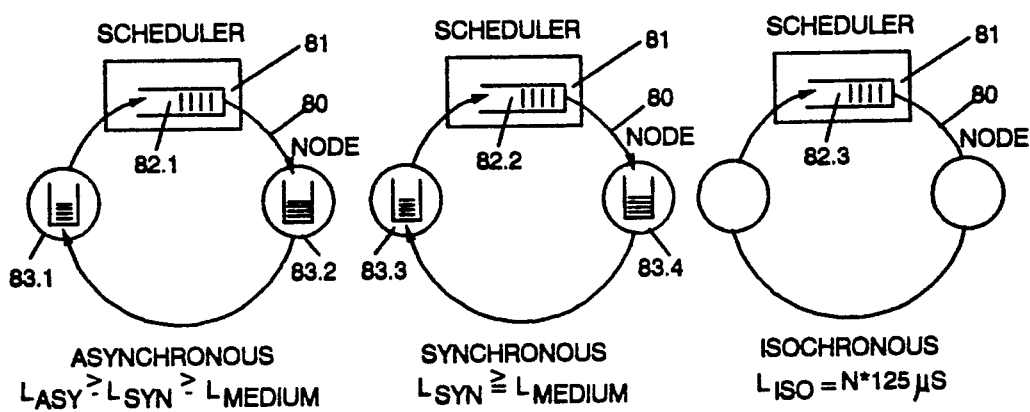
FIG. 9 shows three different ring latencies.

Together with a similar hierarchical organization in the nodes, this organization of elasticity buffer in three separate buffers 71, 72, and 73 permits the realization of three independent transmission services: isochronous, synchronous and asynchronous. On an insertion ring 80, the transmission entities of these three traffic types experience different latencies ($L_{ASY}$, $L_{SYN}$, $L_{ISO}$), as illustrated in FIG. 9:

asynchronous slots are delayed either in scheduler buffer 82.1 or in insertion buffers 83.1, 83.2 in the nodes, by preempting isochronous slots, by by-passing synchronous slots as well as signalling command/messages, and previously arrived asynchronous slots.

synchronous slots are only delayed either in scheduler buffer 82.2 or in insertion buffers 83.3, 83.4 in the nodes, by preempting isochronous slots and previously arrived synchronous slots or signalling commands/messages.

owing to the hierarchical by-pass structure in the nodes (constant delay) and the time-controlled elastic isochronous buffer 82.3 in the scheduler 81, the latency for isochronous slots is exactly N times 125 μs (where N is an integer number of framing periods).

Establishment and release of isochronous channels

Nodes request the establishment and the release of isochronous channels by higher-layer messages to the scheduler. The establishment of an isochronous channel comprises acceptance check, positioning of the channel in a memory map located in the scheduler (one framing period is sufficient), and providing a strict periodic stream of isochronous slots for that channel at the right position within the framing period. As we will see in more detail in the section "isochronous transmission service", the scheduler inserts new free isochronous slots into the outgoing ADU stream during establishment of an isochronous channel. Insertion eliminates all drawbacks encountered in ring implementations with a fixed slotted transmission data structure. Then, an incoming busy slot (which can only be asynchronous or synchronous) arriving during insertion of an isochronous slot is delayed within its elastic buffer in the scheduler. Thus, establishing an isochronous channel means generation of isochronous slots in all framing periods being on the ring accompanied by destroying an equivalent number of free asynchronous/synchronous slots. Destroying lags behind generation because busy asynchronous/synchronous slots cannot be selected as candidates for destroying them. On a ring, the same channel can be used for a two-way connection between two nodes.

The release of an isochronous channel works in the opposite way that the scheduler destroys the corresponding isochronous slots and generates asynchronous slots as replacement.

Temporarily deactivation and activation of isochronous channels

When the established channel is not used for a longer period, it can be deactivated. To do this, the node sends a medium access control command (MAC-command) to the scheduler which stops to send the corresponding isochronous slots. Analogously to a channel release, the corresponding (free) isochronous slots are replaced by asynchronous slots. For activation, the node simply inserts generated isochronous slots at the right positions within the framing periods. In this way, the isochronous channel is immediately available. In case, both nodes simultaneously start inserting isochronous slots no problems arise because when an isochronous slot arrives already at the right position no isochronous slot must be inserted. Thus, deactivation of isochronous channels is done via the scheduler while activation occurs completely distributed. The deactivation of an established isochronous channel happens purely on the MAC-level.

Rearrangement of isochronous channels

In case that during establishment of an isochronous channel requiring more than one isochronous slot position, no sufficient spacing between already allocated channels exits, a channel rearrangement is principally easy to do. A rearrangement means here merely delaying some of the channels within a time interval of one framing period. This is possible, because the nodes recognize their slots by an isochronous channel identifier. After rearrangement, the scheduler issues at least one framing period up to one ring network latency, with also all temporarily deactivated isochronous slots present, so that the corresponding nodes obtain their new slot position.

Principal structure used in nodes

Figure 10:
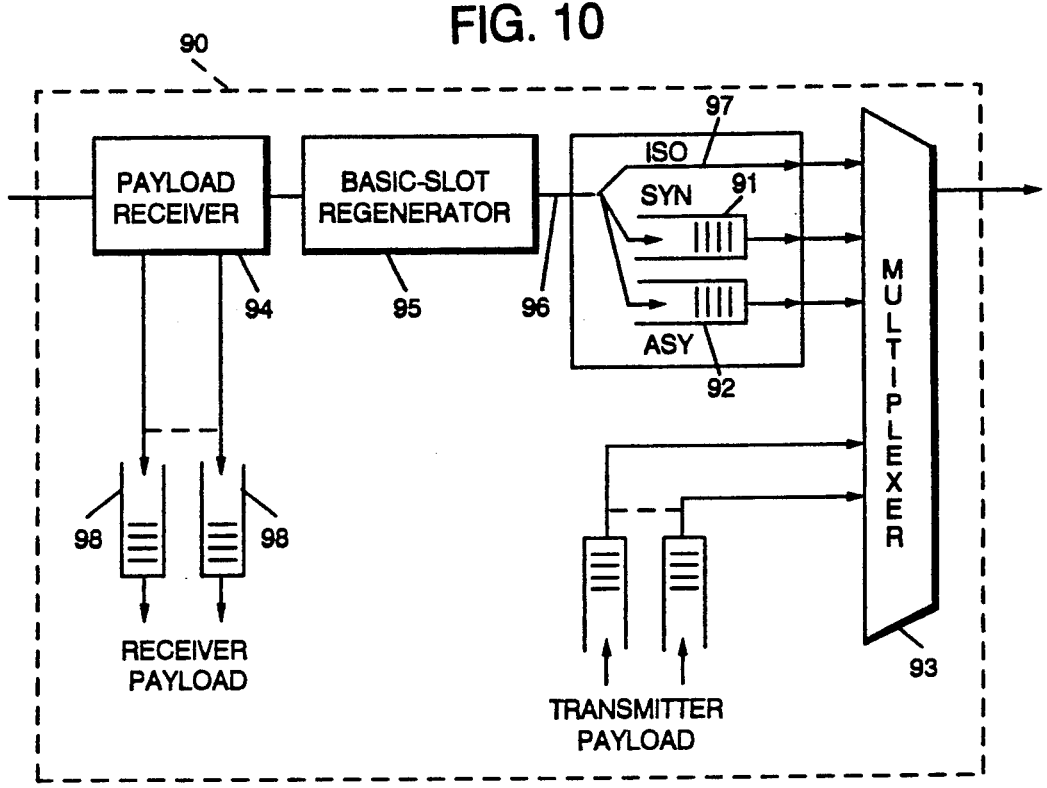
FIG. 10 shows a principal structure in a node, according to the present invention.

FIG. 10 shows a schematic diagram of the MAC part of a node 90, according to the present invention. In the first stage, the destination address is checked for payload copying, by a payload receiver 94. If payload is addressed to this node it is copied into receiver payload buffers 98. Subsequently, in the second stage a multi-slot is divided into its former basic-slots, using basic-slot regenerator 95, when node and removal addresses match. With this, the output of the second stage 96 is equal to an operation mode without multi-slots. The third stage shows the separation of asynchronous, synchronous and isochronous slots. Isochronous slots pass through a node via connection line 97 without being delayed inside a buffer. However, there is a constant delay owing to pipeline-mechanisms that do not affect the isochronous behavior and therefore is not shown in this figure. Synchronous and asynchronous slots are delayed inside the buffers 91, 92 when required. The fourth stage holds the multiplexer 93 for all the outbound data paths. Here, also the transmitter payload is multiplexed into a free slot.

Principal structure used for the scheduler function

Figure 11:
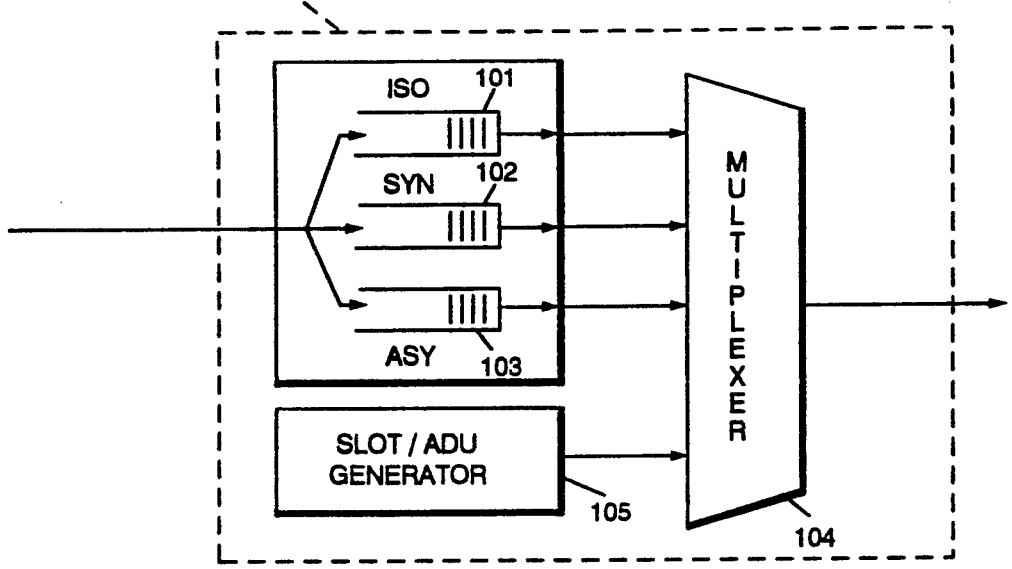
FIG. 11 shows a principal structure in a scheduler, according to the present invention.

FIG. 11 shows a schematic diagram of the MAC part of a scheduler 100. To guarantee for each transmission service its own ring latency, incoming isochronous, synchronous and asynchronous slots at the scheduler 100 are separated and buffered independently from each other, using the buffers 101, 102, and 103, respectively. All different data paths are output via the outbound multiplexer 104. New slots, either asynchronous, synchronous or isochronous are generated by the slot generator 105. This is also an ADU generator for the signalling command and for stuffing in case of decentralized clocking.

Self-adaptation: minimal transmission overhead

Data transmissions may occur as frame-by-frame in contiguous slots or as cell-by-cell in autonomous entities carried by single slots (basic-slots). To achieve optimal bandwidth efficiency for frame transmissions, all contiguous slots are concatenated into a multi-slot whereby unnecessary slot overhead becomes free for data payload. Such a multi-slot is created at the source node and is divided again into individual slots at the node that frees the multi-slot (removal node). Thus, a multi-slot exists only during the frame transmission. The number of concatenated contiguous slots corresponds to the length of the transmitted frame.

Self-adaptation: maximum bandwidth efficiency

In C-CRMA, as described in the European patent application 91810224.5, "Medium Access Technique For LAN System", reserved slots become always free gratis (unrestricted access) as soon as they are made free. Additionally, free reserved slots are set to free gratis by nodes with superfluous confirmations. Furthermore, it is feasible that slots change to lower priority classes when a reserved slot has been used. When slots are used in this or a similar manner the transmission system naturally adapts to maximum bandwidth efficiency. Additionally, when isochronous channels are released, the freed bandwidth becomes immediately available for synchronous and asynchronous traffic. Analogously, by establishing an isochronous channel, the asynchronous/synchronous part is correspondingly reduced. Moreover, the partitioning between asynchronous and synchronous slots is completely dynamic.

Self-adaption: optimal bandwidth sharing among transmission services

In the packet-switching data-infrastructure, there exist two transmission services: synchronous and asynchronous. In C-CRMA, see European patent application 91810224.5, "Medium Access Technique For LAN Systems", busy synchronous slots always become free asynchronous slots at the removal node. At the other hand, free (but gratis) asynchronous slots may be transformed to busy synchronous slots. Furthermore, based on the outcome of the periodic reservation process the scheduler marks slots as reserved synchronous or reserved asynchronous. When slots are used in this way or similarly, slots dynamically change the transmission service according to current demand. As discussed before, a smooth bandwidth partitioning occurs between isochronous channels and the asynchronous/synchronous part.

Self-adaptation: signalling with on-demand bandwidth allocation

Signalling with on-demand bandwidth allocation is intrinsically supported. In C-CRMA for example, as described in the European patent application 91810224.5, "Medium Access Technique For LAN System", the scheduler issues a minimum-length reserve command that increases continuously as it collects requests from the nodes. The opposite occurs when the scheduler returns confirmations to the nodes. Now, the scheduler issues a confirm command with a length corresponding to the previously received reserve command. As this command pass the nodes, its length decreases until finally a minimum-length confirm command returns to the scheduler (i.e. only Start and End-Delimiter pair). Similarly nodes can insert individual command messages of variable length into the transmission data-structure. Insertion is always at slot boundaries of the packet-switching data-infrastructure. In principle, signalling commands or messages may belong to the asynchronous or the synchronous transmission service. When asynchronous commands are used, we must take into account that dynamic commands are not based on basic-slots. Thus, since they have no internal boundaries, no preemption by synchronous slots is possible. Synchronous commands by-pass asynchronous slots on boundaries. We propose to use the synchronous transmission service. However for some signalling cases, the asynchronous mode is more appropriate. For example, the Reserve/Confirm commands in C-CRMA should be done asynchronous for the asynchronous transmission service and synchronous for the synchronous one.

Self-adaption: use of temporarily deactivated isochronous channels

The two independent transmission data-infrastructures allow the scheduler to do immediate and exact positioning of isochronous slots within the framing period. The position of the channel is allocated during an establishment phase. Since the scheduler can put isochronous slots at any time on the transmission medium, it becomes attractive to deactivate isochronous channels when they are temporarily not in use. By replacing its isochronous slots by asynchronous slots, a node can deactivate its isochronous channel. The freed bandwidth becomes naturally available for the asynchronous and synchronous transmission services. For immediate activation, the node simply inserts isochronous slots at the right position in the framing period and destroys free asynchronous slots.

Self-adaptation: immediate effective rearrangement of isochronous channels

Each node recognizes occurrence of its isochronous channel by an explicit channel identifier. Because of this, occasional rearrangements of isochronous channels becomes immediate effective and needs no higher layer communication between scheduler and involved nodes. Such rearrangements might be necessary during connection set-up. For instance, when a new channel requires a large number of contiguous slots and the distributed positions of existing isochronous channels does not allow its positioning. It should be noted that no rearrangements must be made to increase system throughput. It should be noticed that rearrangement only means delaying some of the isochronous channels within a framing period. There is no channel interchange.

Circuit-switching data-infrastructure

Figure 12:
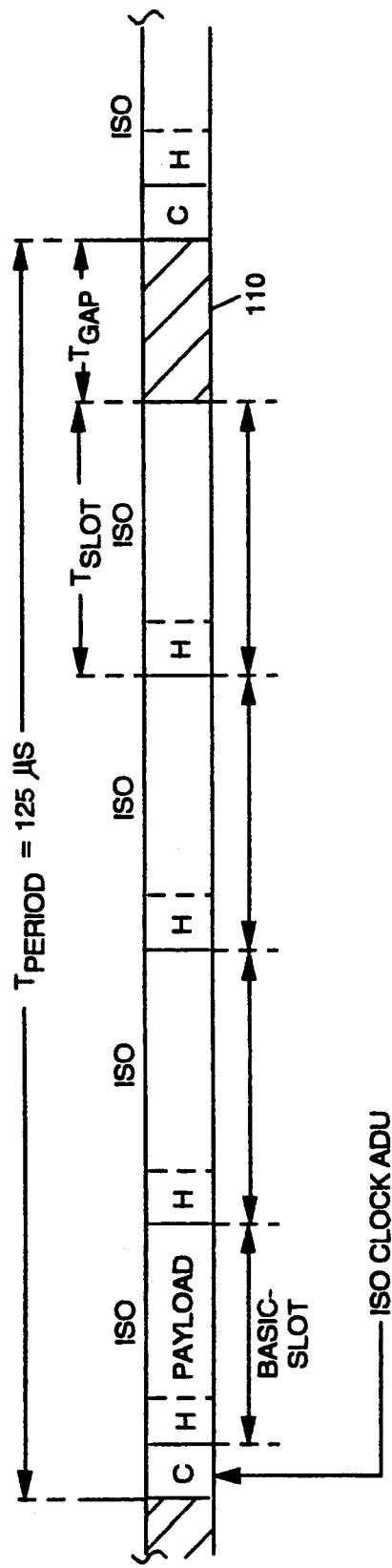
FIG. 12 shows an isochronous framing period and positions of isochronous slots.

FIG. 12 shows the data-infrastructure defining the positions of isochronous slots 111.1–111.4 in a framing period 112 $T_{period}$ of 125 μs. A framing period always starts with the Isochronous-Clock-ADU 113 (indicated by C) that allows all nodes to derive the isochronous clocking rate even when there temporarily no isochronous channels exist. Thereafter follow an integer number $N_s$ of isochronous slot positions. This number depends on the size of an isochronous slot and the bit rate on the transmission medium. For 1.2 Gb/s, 64-byte slots and 8B/10B coding, the number of isochronous slot position $N_s$ is equal to 242 slots. The remaining part 110 of the framing period 112 (fraction of a slot) cannot be used for isochronous channels. Only for the case that the network would carry merely isochronous channels this gap 110 is padded with Stuffing-ADUs. Isochronous channels may consist of one or more contiguous slots. The selection of the slot positions does not affect the bandwidth efficiency. Thus, arbitrary isochronous slots can be assigned to isochronous channels.

Packet-switching data-infrastructure

Figure 13:
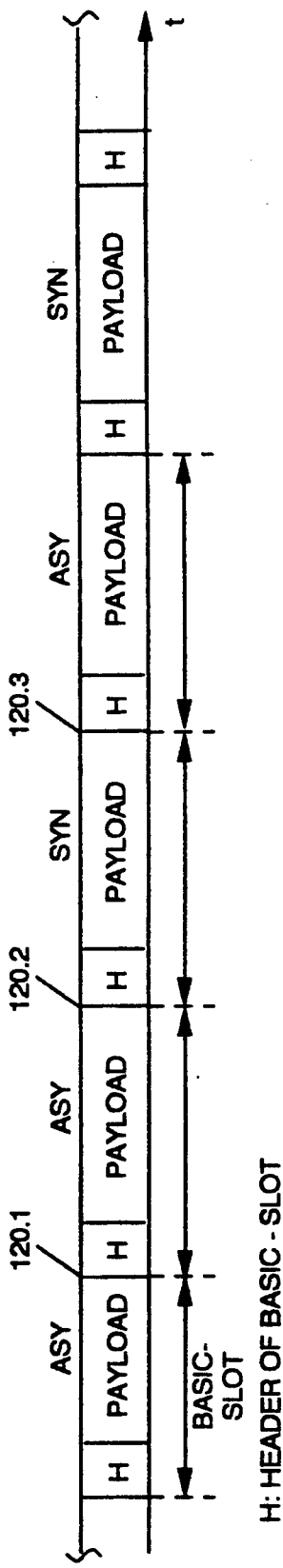
FIG. 13 shows a continuous flow of synchronous and asynchronous slots.
Figure 14:
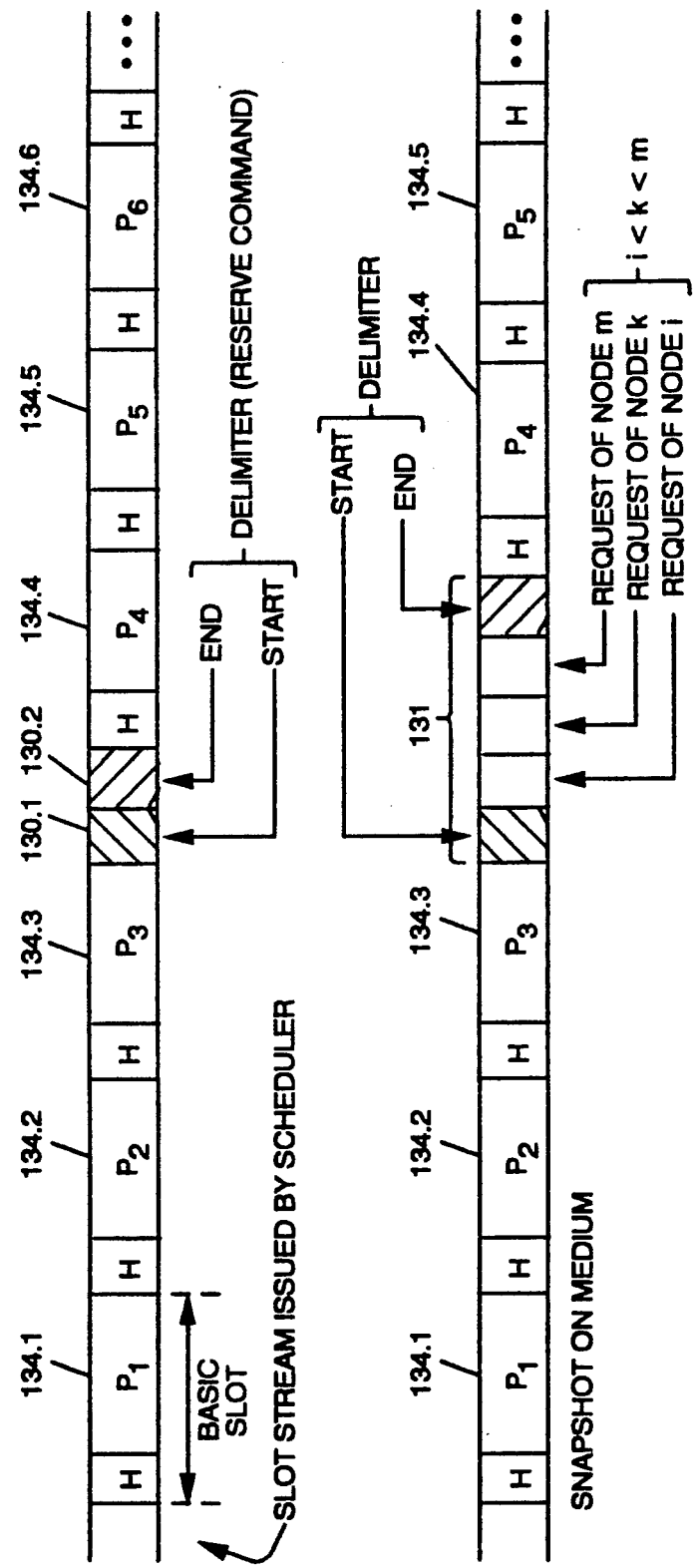
FIG. 14 shows on-demand signalling between synchronous/asynchronous slots.

FIG. 13 shows the overlaying data-infrastructure for the asynchronous 121.1–121.3 (ASY) and synchronous 122.1–122.3 (SYN) slots. There is no framing period, so that the stream of slots is continuous. Synchronous slots 122.1–122.3 may by-pass asynchronous slots 121.1–121.3 on slot boundaries 120.1, 120.2, and 120.3. In FIG. 14, the elasticity of the packet-switching data-infrastructure is illustrated by an example with dynamic signalling. The upper part of the figure shows a continuous stream of asynchronous slots 134.1–134.6 with payloads $P_1, P_2, \ldots$ and an empty Reserve command 130.1, 130.2 (between slots 134.3 and 134.4) as issued by the scheduler in C-CRMA. As this command passes nodes i, k and m inserting reservation information, the Reserve command 131 grows, so that the following slots 134.4–134.6 are delayed accordingly, as shown in the lower part of FIG. 14.

Slot stream examples

Figure 15:
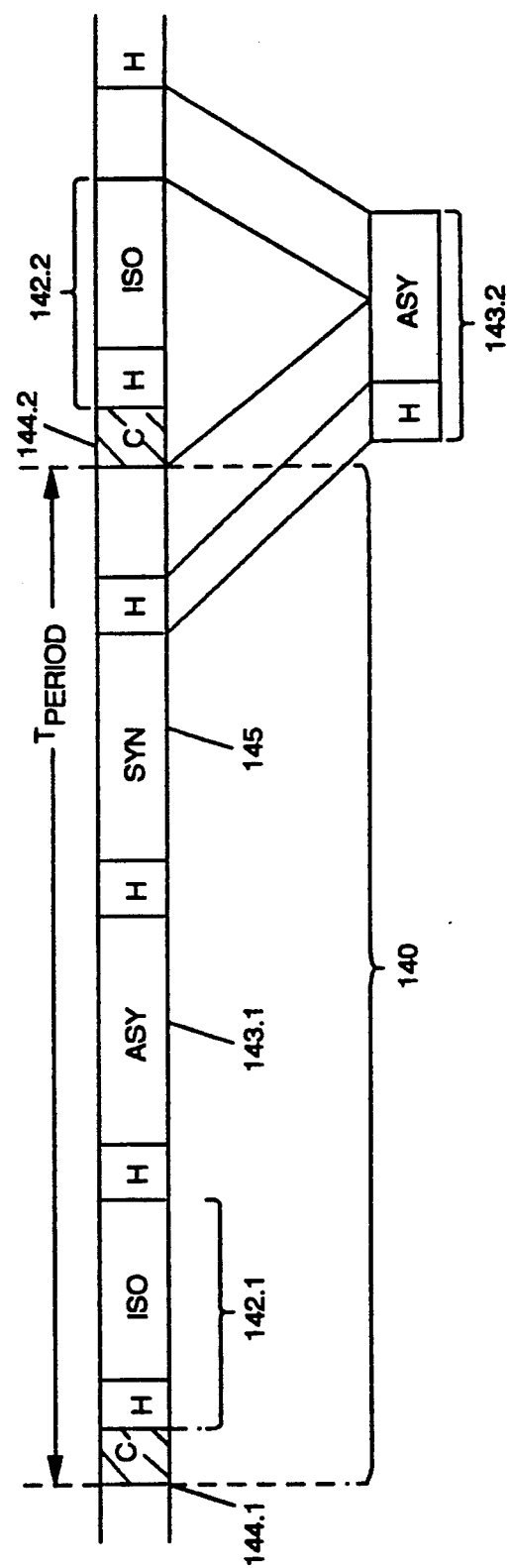
FIG. 15 shows isochronous slots combined with synchronous/asynchronous slots.

In FIG. 15 the combination of the three kind of slots 143.1, 143.2, 145, 142.1, 142.2 (ASY, SYN, ISO) is illustrated. The framing period 140 starts with the Isochronous-Clock-ADU 144.1 denoted by C followed by an isochronous slot 142.1. The choice of the first position for the isochronous slot is arbitrary. Thereafter follow asynchronous slots 143.1–143.3, whereby the ASY slot 143.2 at the boundary of the framing period 140 is preempted by both the Isochronous-Clock-ADU 144.2 and the isochronous slot 142.2 of the next framing period. Preemption is on an ADU boundary. Thus, the asynchronous slots flow around the fixed positioned isochronous slots. From this figure, we notice also that there is no gap between framing periods.

Figure 16:
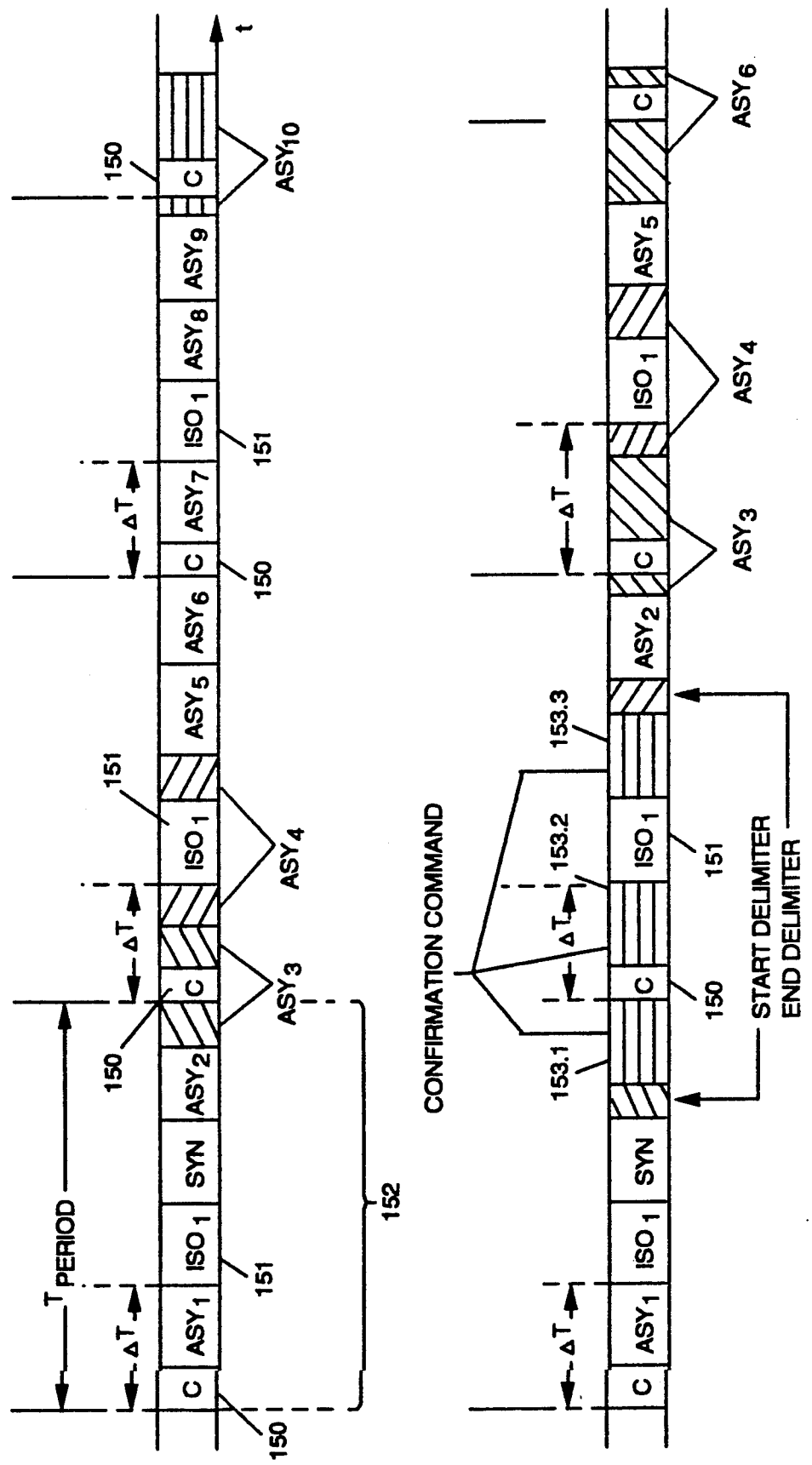
FIG. 16 shows isochronous and synchronous/asynchronous slots with on-demand signalling.

In a next example, given in FIG. 16, on-demand signalling is included. The upper part of the figure shows again the loose flow a asynchronous/synchronous slots around the Isochronous-Clock-ADU 150 (C) and an isochronous slot 151 ($ISO_1$). This fixed positioned slot 151 is now not immediately at the beginning of the framing period 152. We see further that asynchronous slots $ASY_3$ and $ASY_{10}$ are preempted by the Isochronous-Clock-ADU 150 and that isochronous slot 151 $ISO_1$ preempts slots $ASY_4$. In the lower part of FIG. 16, a Confirm command 153.1–153.3 (as used for instance in C-CRMA) delays the asynchronous slots starting with $ASY_2$. Furthermore, the command 153.1–153.3 has been preempted twice. First by the Isochronous-Clock-ADU 150 and then by the isochronous slot 151 $ISO_1$. It can also be noticed that the asynchronous slots $ASY_3$, $ASY_4$, $AASY_6$ are now preempted at different positions as in the upper part of the figure.

Structure of the different Atomic Data Units (ADUs)

Figure 17:
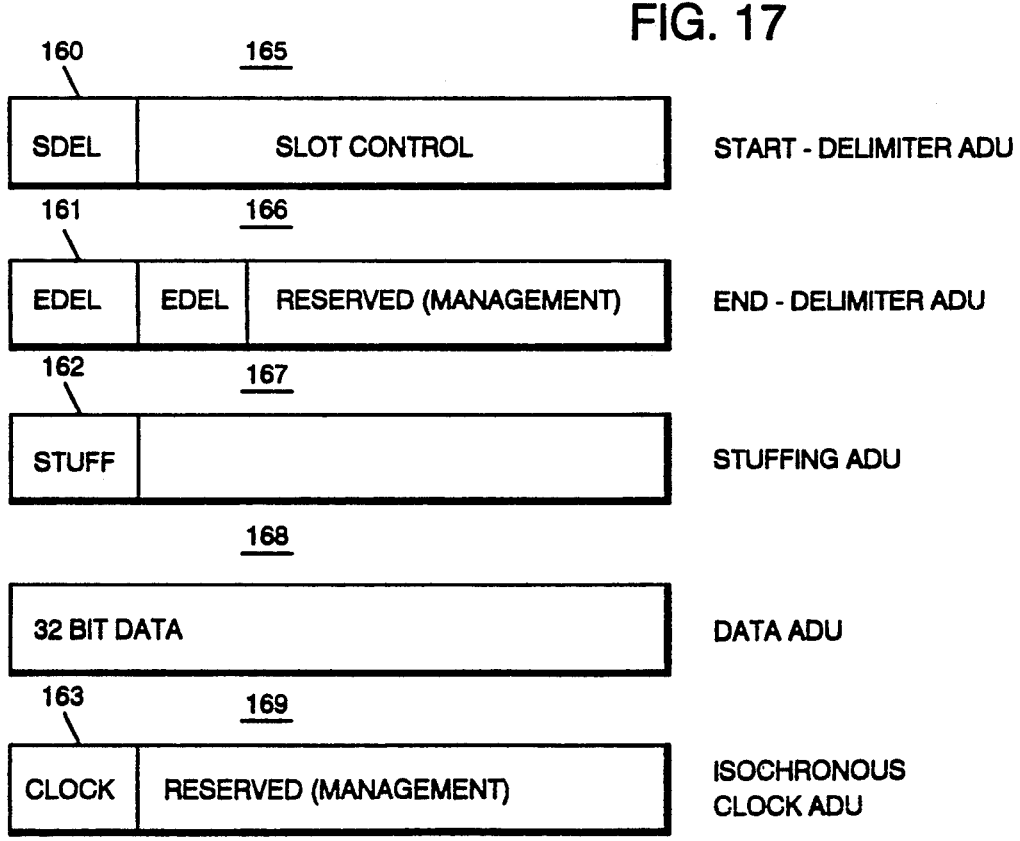
FIG. 17 shows the structures of different Atomic Data Units (ADUs)

FIG. 17 shows the five different ADUs that basically form the different slots used in the present transmission method. These are the Start-Delimiter-ADU 165 and End-Delimiter-ADU 166 embedding each transmission entity, the Stuffing-ADU 167, the 32-bit Data-ADU 168, and the Isochronous-Clock-ADU 169. The first byte 160, denoted by SDEL, is a extraordinary codeword and is therefore used for robust codeword synchronization on the start boundary of a slot. The extreme robustness is obtained because a single bit error on regular codewords never become a SDEL 160. This means the SDEL 160 is single bit error protected. The first bytes denoted by EDEL 161, STUFF 162 and CLOCK 163 are also special codewords, but with regular robustness. The other parts of the ADUs 165-169 and also the complete 32-bit DATA-ADU 168 are regular codewords. In the following, these ADUs are discussed in more detail.

Start-Delimiter-ADU 165

Figure 18:
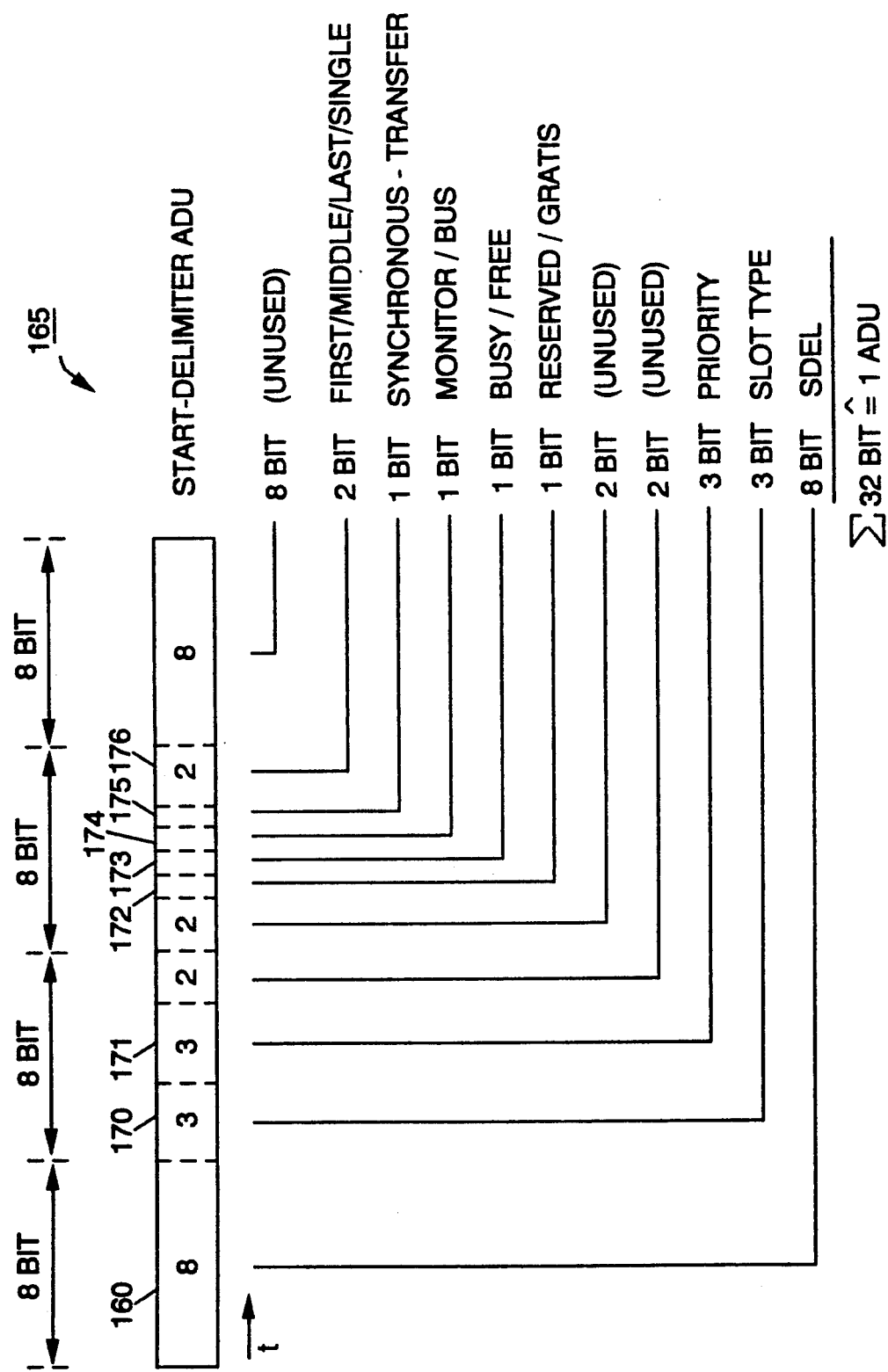
FIG. 18 shows the structure of a Start-Delimiter-ADU.

The Start-Delimiter-ADU 165 defines the start of a basic-slot or a signalling command. It is further used as basic-slot skeleton in a multi-slot. Slots may belong to the isochronous, synchronous or asynchronous transmission service. The Start-Delimiter-ADU consists of the special codeword (8 bits) denoted by SDEL 160 and the slot control part (24 bits). Slot control carries all the information needed by the MAC-protocol and the transmission data-structure. The bit positions shown in FIG. 18 is only an example. It should be noticed that all 32 bits are simultaneously available because the 32-bit Data-ADU is the hardware processing unit. The slot type 170 (S-type) identifies to which transmission service the arriving slot currently belongs or whether a variable-size signalling command arrives. A priority indication 171 permits further differentiation for each slot type. Presumably, priorities would be used only for the asynchronous transmission service. The Reserved/Gratis flag 172, the Busy/Free flag 173 and the synchronous Transfer flag 175 are used in C-CRMA, as described in the European patent application 91810224.5, "Medium Access Technique For LAN Systems". The Monitor flag 174 allows garbage collection on a ring. On a dual-bus, the same flag can be used as Bus flag needed to operate C-CRMA on such a topology. Finally, first-middle-last or single flag 176 identifies a multi-slot or a basic-slot. In case of a multi-slot, first-middle-last identifies the sequence of the concatenated basic-slots.

End-Delimiter-ADU 166

Figure 19:
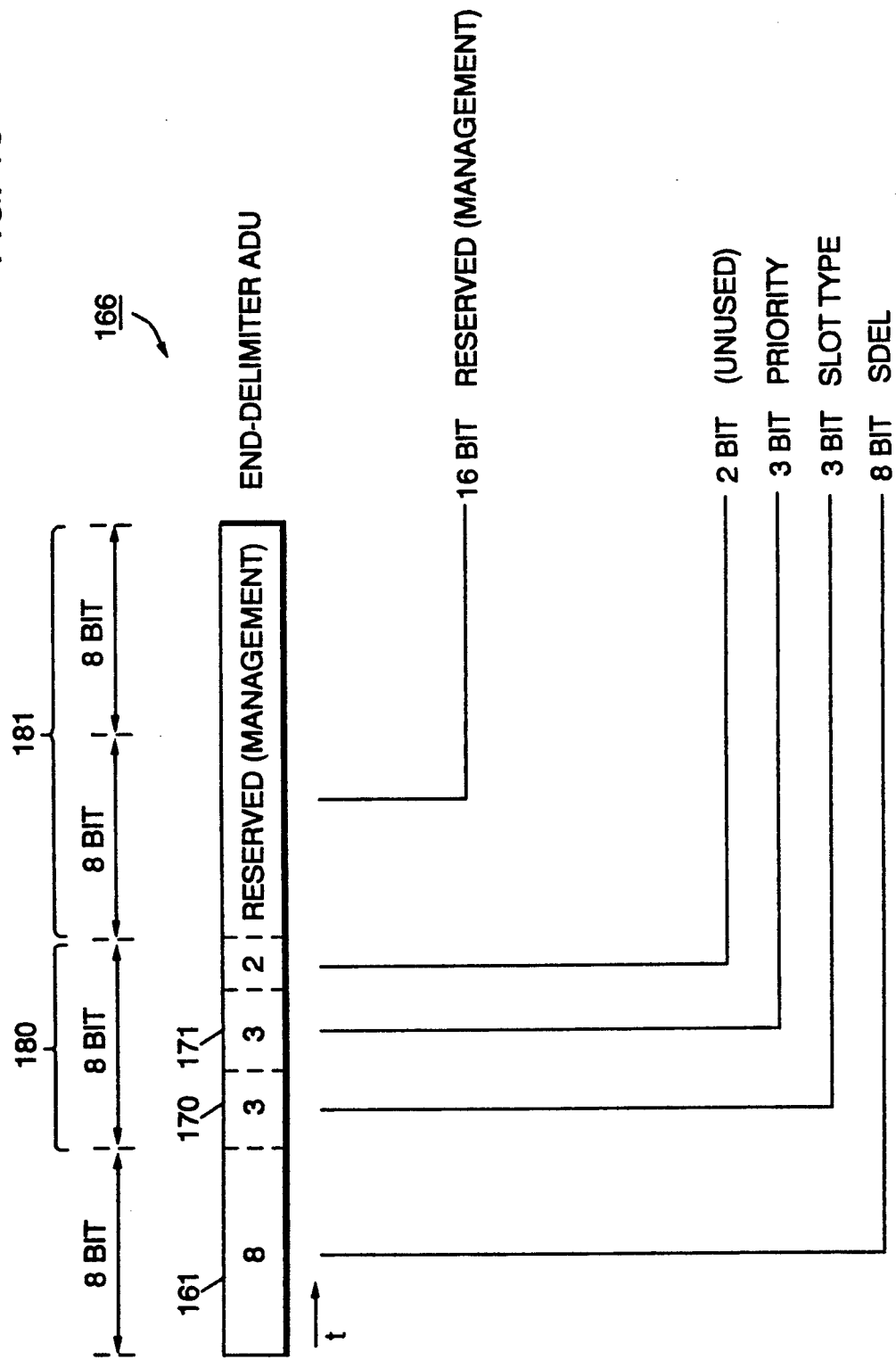
FIG. 19 shows the structure of an End-Delimiter-ADU.

The End-Delimiter-ADU 166, illustrated in FIG. 19, defines the end of a basic-slot, a signalling command, or a multi-slot. Slots belong to the isochronous, synchronous or asynchronous transmission service. It consists of one special codeword (8 bits) denoted as EDEL 161, the EDEL control 180 (8 bits), and a reserved part 181 (16 bits) for management purposes or telemetry data transmission. The EDEL control 180 carries an exact copy 170, 171 of the bit setting in the Start-delimiter ADU of the slot, shown in FIG. 18. This allows robust error recovery.

Stuffing-ADU 167

The Stuffing-ADU 167 (32 bits) is defined by one special codeword 162 (FIG. 17) denoted by STUFF (8 bits) for the stuffing delimiter. The remaining 24 bits are idle. Stuffing-ADUs 167 are used by the scheduler as well as by the nodes to compensate different clocking rates on the inbound and the outbound path when decentralized clocking is applied.

32-Bit Data-ADU 168

Figure 20:
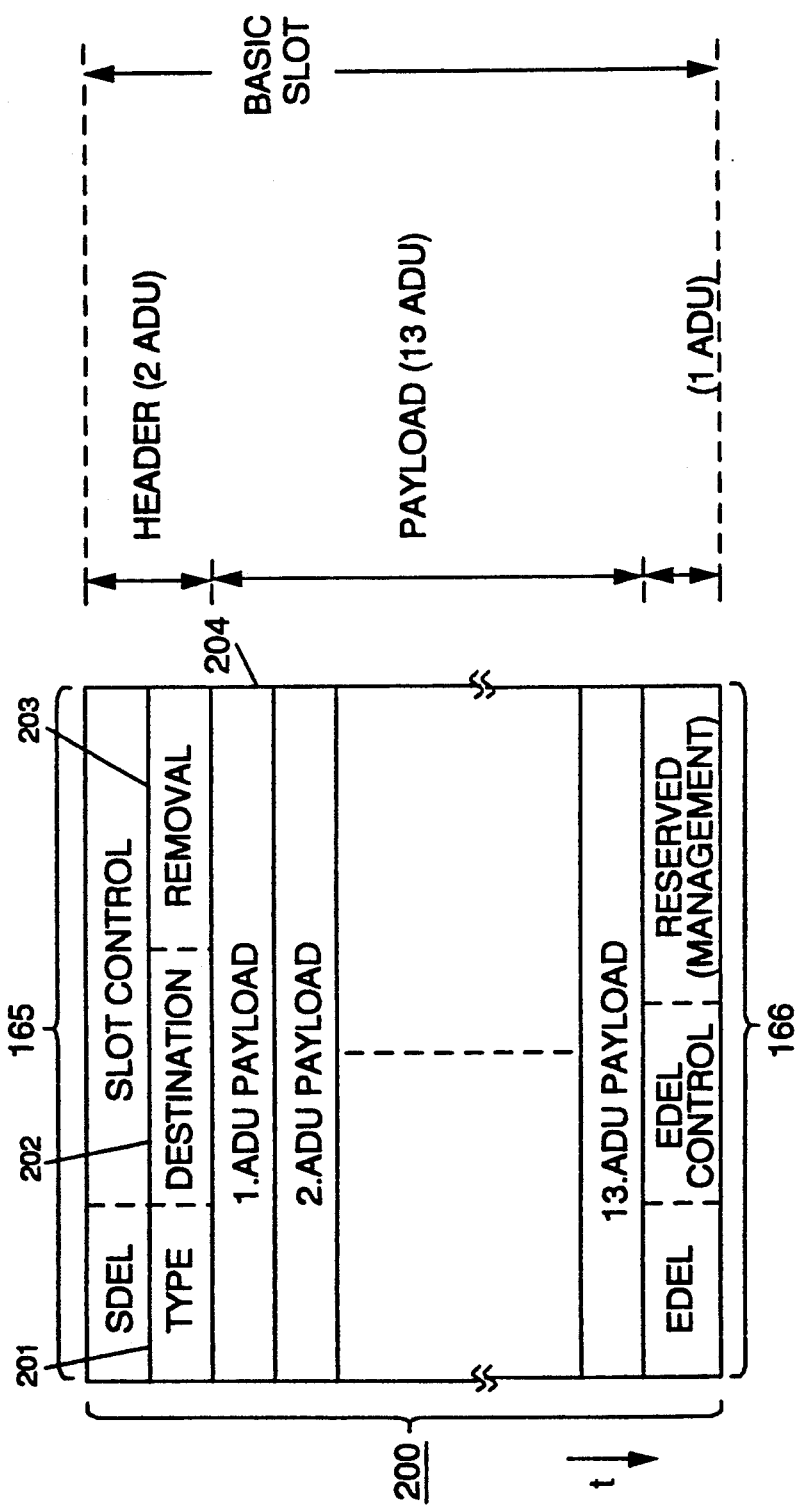
FIG. 20 shows the structure of an asynchronous/synchronous basic-slot.

A 32-bit Data-ADU 168, as illustrated in FIGS. 17 and 20, carries either payload information or additional signalling information. If it is used for addressing for asynchronous and synchronous slots, it carries a type field 201 (protocol type) as well as a physical node addresses destination 202 and removal 203. The type field 201 (8 bits) allows frames of many different formats from many different interfaces to be accommodated in a transparent way. Different formats are made possible because with the type field to appropriate addressing scheme (protocol) can be selected (e.g. FDDI, DQDB, Token ring). For synchronous slots, it can specify the nature of the traffic (voice, video, other), perhaps a compression method, a connection identifier, or other characteristics. The destination address 202 (node address destination) (12 bits) is the physical address of the receiving node(s) which copy the carried payload 204. The removal address 203 (12 bits) (node address removal) identifies where a slot will be made free again or where multi-slots are split up into free basic-slots. Physical node addresses are strictly local and no global coordination is needed. Thus, the destination address 202 informs the receiving node or nodes to copy the payload of the slot. The removal address 203 defines the node that has to free the slot. This might be the source node (broadcast) or the destination node.

Figure 21:
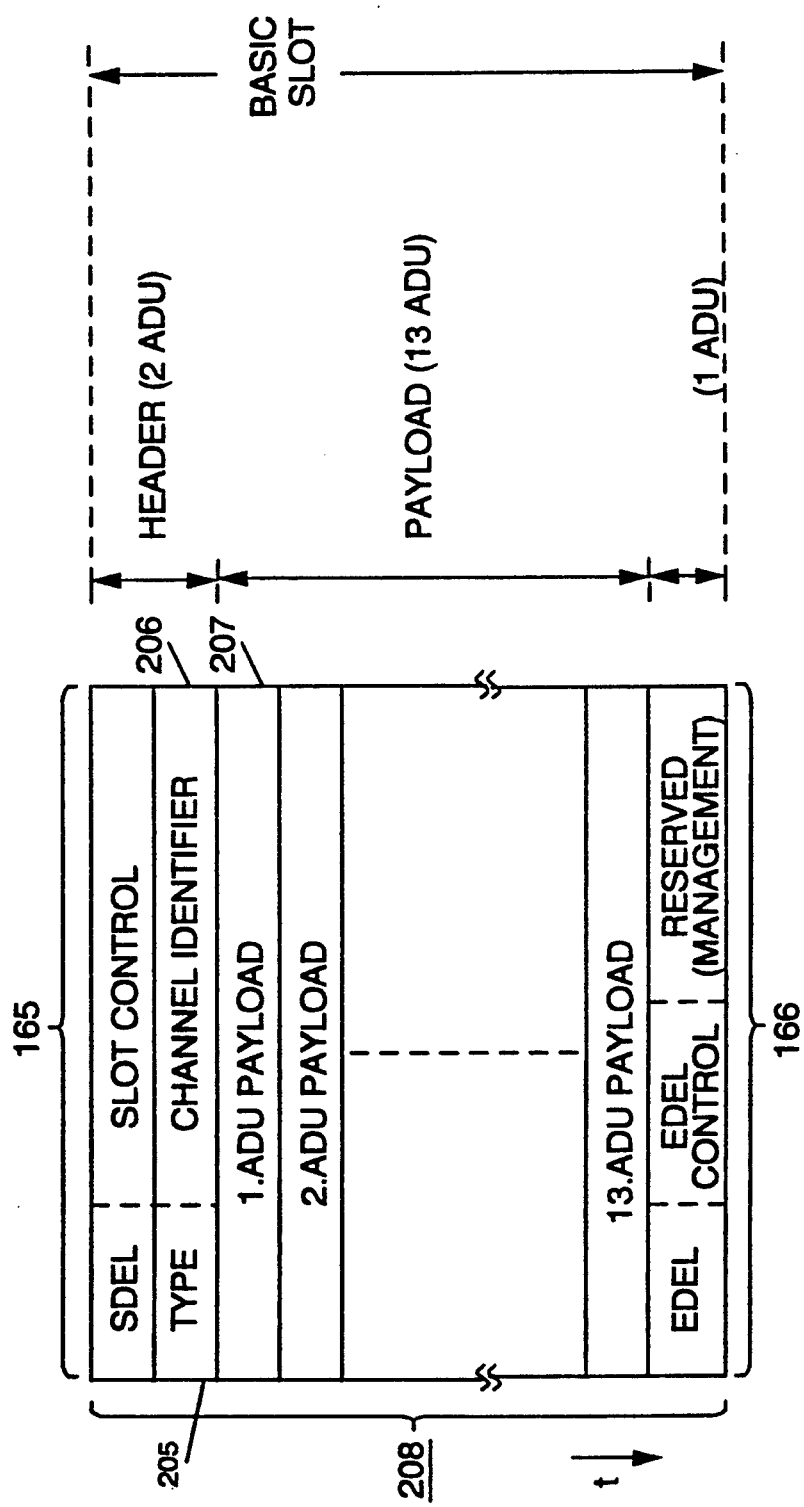
FIG. 21 shows the structure of an isochronous basic-slot.

An addressing Data-ADU, illustrated in FIG. 21, for the isochronous transmission service, here a 32-bit Data-ADU, carries a type field 205 (protocol type) and a channel identifier 206 for the isochronous channel. The type field 205 (8 bits) allows to include additional information to the addressing by the channel identifier 206. The channel identifier 206 could for instance consists of the physical node address plus sub-addresses. Nodes recognize there isochronous channels by the channel identifiers not merely by position. In this way, the scheduler can also move the position of isochronous channels when required without explicitly notifying the nodes. Of course, position movements must be kept seldom and they occur only within a frame period.

Isochronous-Clock-ADU 169

The scheduler begins an isochronous clock interval (framing period) with an Isochronous-Clock-ADU 169 (32 bits), shown in FIG. 17. This ADU is system wide unique so that all nodes are able to derive clocking information with the rate of the scheduler internal interval even in that cases, where no isochronous channel is allocated. The time intervals between the Isochronous-Clock-ADU 169 and the associated isochronous channels (slots) do not change as they travel on the transmission medium. The isochronous-Clock-ADU 169 is defined by one special codeword 163 of 8 bits length, denoted by CLOCK. The remaining 24 bits are used for network management and telemetry data.

Asynchronous transmission service

Asynchronous slots provide an asynchronous transmission service which is commonly used today to transmit all kinds of data traffic ranging from short messages to large data quantities. In the transmission hierarchy, the asynchronous slots obtain no transmission favors.

Basic-slot structure

FIG. 20 shows a possible structure for a basic-slot 200 for asynchronous transmission service. It consists of two header ADUs 165 and 201, 202, 203, thirteen payload ADUs 204 and the End-Delimiter-ADU 166. The header of the basic-slot contains a Start-Delimiter-ADU 165 and an addressing Data-ADU 201, 202, 203. Addressing comprises the protocol type 201, destination address 202 and removal address 203. The payload part 204 (52 bytes) has been chosen to fit the essential part of an ATM cell.

Synchronous transmission service

Synchronous slots provide a synchronous transmission service intended to meet time-sensitive traffic requirements for services like packetized voice and video when operated on a buffer-insertion LAN. These slots receive an expedited transmission treatment in that all synchronous slots can by-pass asynchronous slots being delayed by a buffer in the transmission path. This holds both for the elastic buffer in the scheduler and insertion buffers in the nodes. The latter ones are only present in buffer insertion LANs. Only complete slots can be by-passed. Thus, asynchronous slots are not preempted by synchronous slots.

Basic-slot and multi-slot structure

The basic-slot and multi-slot structure for synchronous slots have the same structure as asynchronous slots. Only the treatment of synchronous slots is different from that of asynchronous slots because of by-passing.

Isochronous transmission service

Isochronous slots provide an isochronous transmission service which corresponds to a pure circuit-switched service. To meet strict periodicity isochronous slots can be transmitted at any time. Thus, they are allowed to preempt synchronous and asynchronous slots as well as signalling commands or messages.

Basic-slot structure

FIG. 21 shows the corresponding structure for a basic-slot 208 for isochronous transmission service. It consists again of two header ADUs 165 and 205, 206, 13 payload ADUs 207 and the End-Delimiter-ADU 166. The header contains the Start-Delimiter-ADU 165 and the addressing Data-ADU, consisting of a type part 205 and a channel identifier 206. Inclusion of the protocol type field 205 for future usage seems to be helpful.

Framing period

To get a periodic stream of isochronous slots, the scheduler operates internally with a given time interval (framing period). The period of that interval is set-up at the network configuration time instant. The scheduler issues at the beginning of an framing period an Isochronous Clock-ADU 169. This allows all nodes to derive clocking information for isochronous operation.

Time-controlled insertion of isochronous slots

Figure 22:
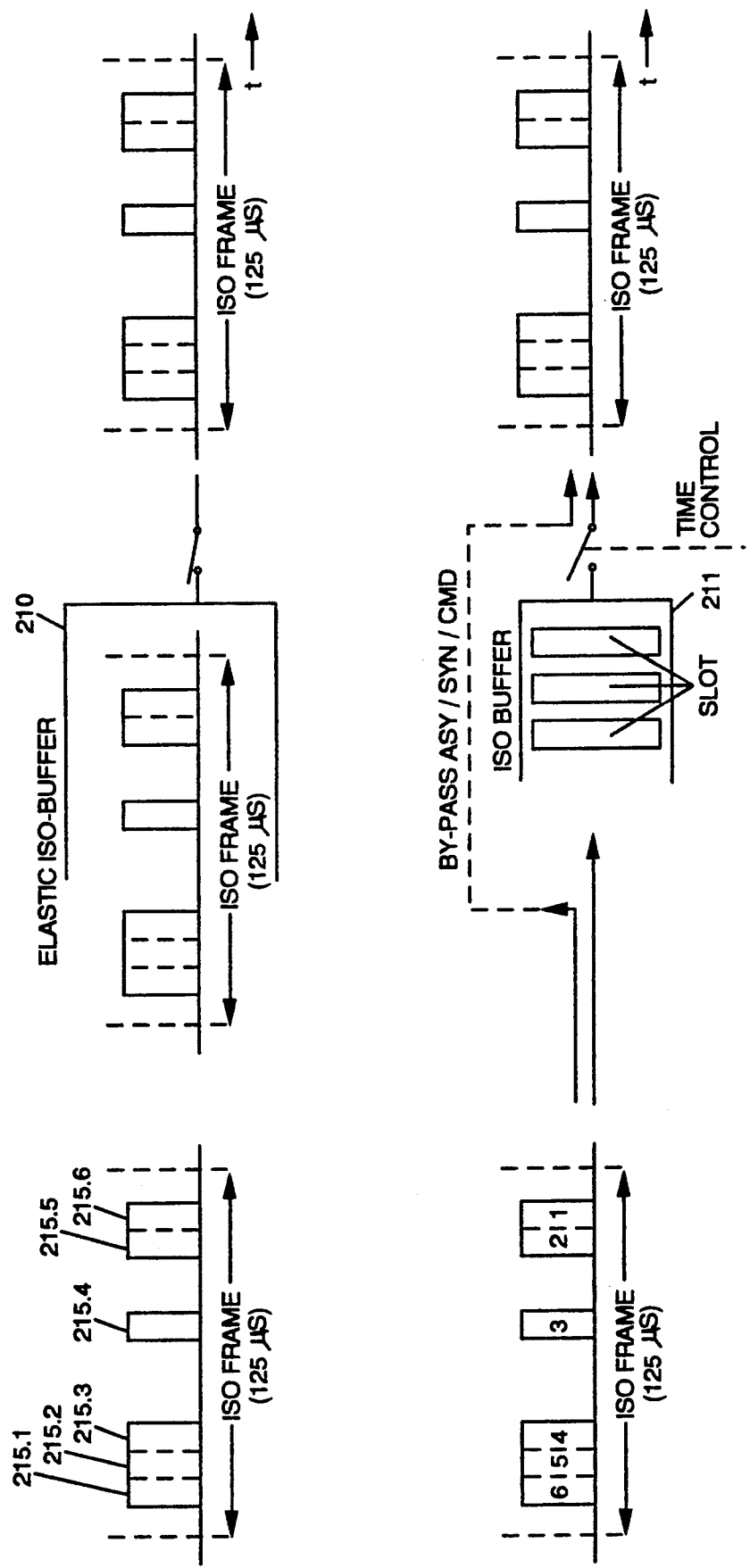
FIG. 22 shows a time-controlled insertion of isochronous slots.

The hierarchical structure of the elastic buffer in the scheduler permits to delay isochronous slots without delaying the asynchronous and synchronous slots. In FIG. 22, the differences between the hierarchical approach, lower part of the figure, and the approach, upper part of the figure, with a single elastic buffer 210 is displayed. The lower part shows that isochronous slots are delayed in the ISO-buffer 211 without the time spacing present on the transmission medium. All other slots and signalling commands can by-pass (provided that the corresponding buffers are empty). The delayed isochronous slots are issued under time-control so that the isochronous slots in the outgoing framing period have the right spacing again. The time-control is for instance easy to implement with a shift register containing the memory map of the framing period. With a single elastic buffer 210 (upper part of figure), spacing is maintained and thus all slots 215.1–215.6 experience the same delay.

Establishment of an isochronous channel

Figure 23:
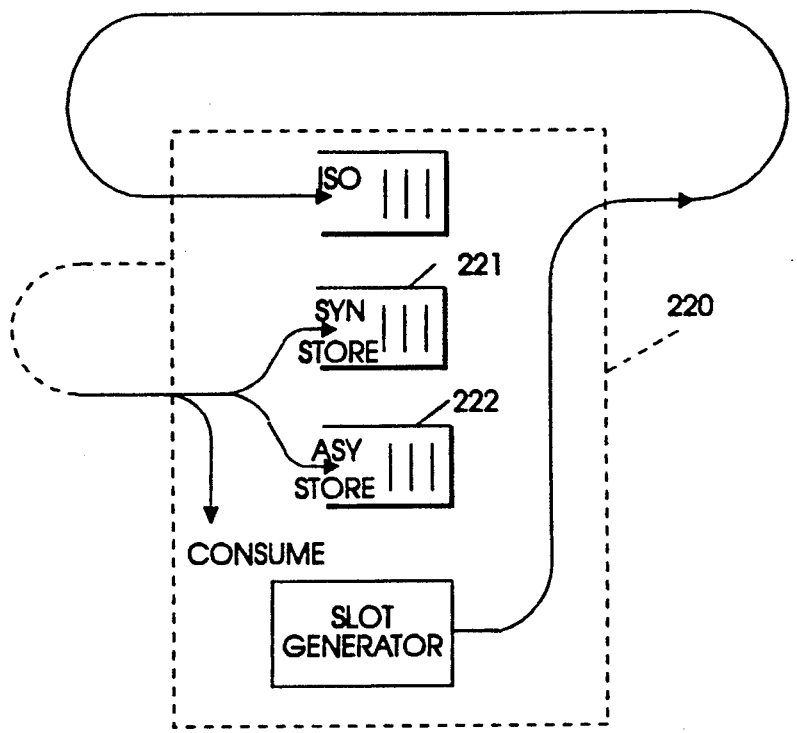
FIG. 23 shows the generation of isochronous slots (Establishing phase)

Nodes request and release isochronous channels by higher-layer messages to the scheduler. During the establishment phase the scheduler does an acceptance check, communicates with the involved nodes (if required at all) and allocates the isochronous channel in its memory map (one framing period is sufficient). So far the normal procedure to establish an isochronous connection is followed. It is, however, to be noticed that on a ring, the duplex communication needs only one channel because the duplex communication takes place over two disjunctive parts of the channel. The absolutely new approach here, is the way strictly periodic slots are issued onto the ring. Assuming that the isochronous channel needs only one slot per framing period, the scheduler must take care that one isochronous slot is present in each of the framing periods on the ring. As illustrated in FIG. 23, the scheduler 220 generates new isochronous slots (one in each framing period) and inserts them into the outgoing ADU stream at the right position. The corresponding channel identifier is included in each new isochronous slot. To compensate, free asynchronous slots must be destroyed. However, there might be temporary surplus of asynchronous slots when arriving slots are busy. Then, an incoming busy slot (which can be only asynchronous or synchronous) that arrive during the insertion process of an isochronous slot is delayed within the corresponding elastic buffer 222, and 221, respectively. This key idea of inserting isochronous slots and delayed removing of asynchronous/synchronous slots when they become free, eliminates all drawbacks encountered in ring implementations with a fixed slotted transmission data structure.

Established active isochronous channel

Figure 24:
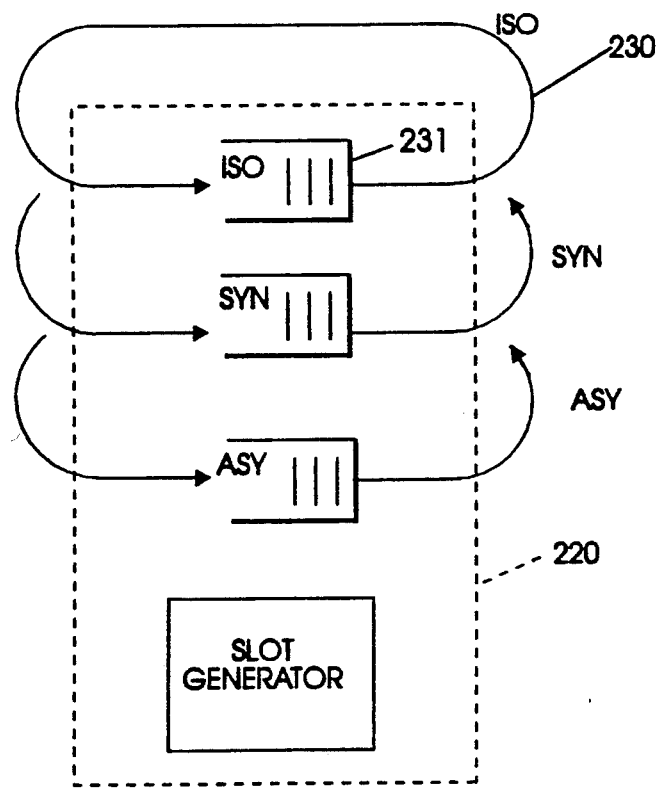
FIG. 24 shows the circulation of isochronous slots (Operation phase)

As soon as all slots of an isochronous channel have been generated they continuously circulate around the ring (symbolic flow of isochronous slots 230) or are temporarily stored in the elastic buffer 231 in scheduler 220 which guarantees an integer number of framing periods, as illustrated in FIG. 24.

Release of an isochronous channel

Figure 25:
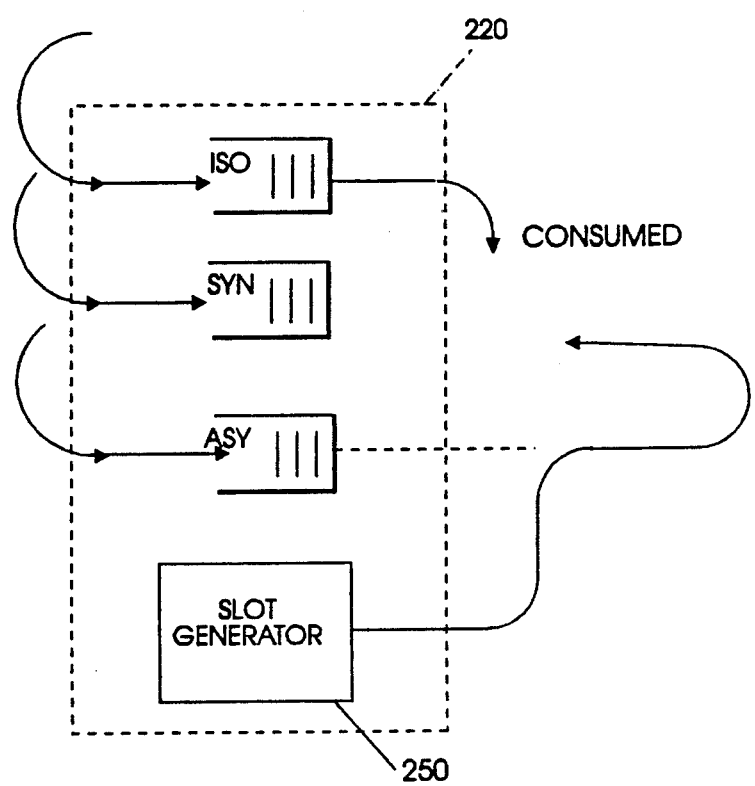
FIG. 25 shows the destroying of isochronous slots (Release phase)

The release of an isochronous channel works in the opposite way that the scheduler 220 replaces the corresponding isochronous slots by asynchronous slots, as illustrated in FIG. 25. A slot generator 250, being part of the scheduler 220, generates these new slots.

Temporarily deactivation of an isochronous channel

When the established channel is temporarily not used, it can be deactivated. To do this, the node sends a MAC-command to the scheduler which than stops to send the corresponding isochronous slots. Analogously to a channel release, the corresponding (free) isochronous slots are replaced by asynchronous slots.

Activation of an isochronous channel

For activation, the node does not need to send a MAC-command to the scheduler. Instead, it inserts generated isochronous slots at the right positions within the framing periods. In this way, the isochronous channel is immediately available. In case, both nodes simultaneously start inserting isochronous slots no problems arise because when an isochronous slot arrives already at the right position no isochronous slot must be inserted. Thus, activation of isochronous channels is done completely distributed.

Rearrangement of isochronous channels

Figure 26:
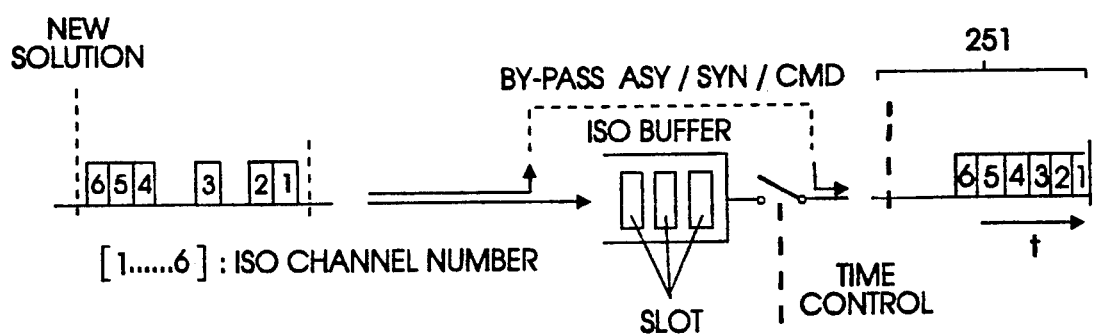
FIG. 26 shows the rearrangement of isochronous channels.

In case that during establishment of an isochronous channel requiring more than one isochronous slot position, no sufficient spacing between already allocated channels exits, a channel rearrangement is principally easy to do. The channel rearrangement process is illustrated in FIG. 26. A rearrangement means here merely delaying some of the channels within a time interval of one framing period 251. This is possible, because the nodes recognize their slots by the isochronous channel identifier. After rearrangement, the scheduler issues at least one framing period up to on ring network latency, with also all temporarily deactivated isochronous slots present, so that the corresponding nodes obtain their new slot position.

Dynamic signalling with on-demand bandwidth allocation

The self-adaptive transmission data-structure permits to exploit the strength of dynamic signalling with on-demand bandwidth allocation, as described in the European patent applications 91810224.5, "Medium Access Technique For LAN Systems", and 9181022.9, "Insert-/Remove Signalling in LAN Systems". In the present invention, bandwidth for signalling commands or messages is not a-priori available, but is only created where and when needed. This kind of "low-level" signalling is intended as complement to higher-layer signalling communication which would be handled as normal data.

Basic structure of signalling commands or messages

All dynamic signalling commands or messages are embedded between a Start-Delimiter-ADU and a End-Delimiter-ADU. They are therefore autonomous transmission entities. The length varies according to the instantaneous need and can thus be smaller than one slot or exceed the length of several slots. Its maximum, however, must be determined during network set-up. Signalling messages have the synchronous by-pass capability, but this is not mandatory.

Generic node structure

Figure 27:
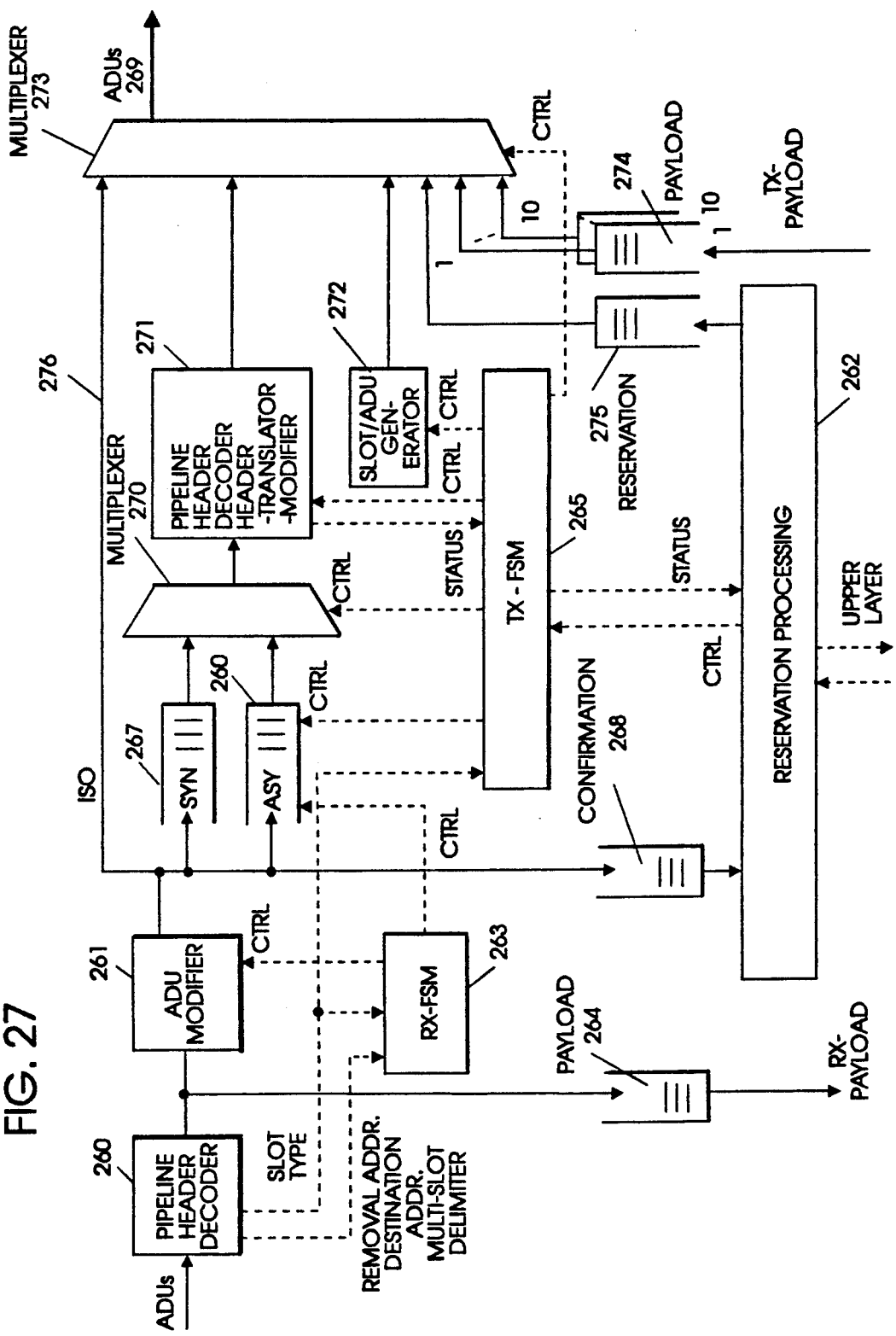
FIG. 27 shows the generic structure of a node according to the present invention.

The generic structure of a node supporting all facilities as described in this patent application is shown in FIG. 27. Not shown are the inbound path (as well as the outbound path), the optical/electrical conversion and the mapping of four codeword groups to the corresponding ADUs (and vice versa). The node itself can be thought of being organized in five modules:
payload receiver,
ADU modifier 261,
ADU/slot dispatcher,
slot and payload transmitter,
reservation processing 262.

In the following, these modules are individually described in detail. It must be noted, that the structure of the modules described here is not fully optimized in the sense that same partial functionalities are not merged. Instead, it does describe the single functionalities and the operation applied to the data as required when the data stream passes the node. The merging of partially overlapping functionalities is assumed to be implementation aspects.

Payload Receiver Module

The payload receiver module consists of three submodules:
pipeline/header decoder 260,
receiver Finite State Machine (RX-FSM) 263,
payload RX-FIFO 264.

Incoming ADUs are decoded in the pipeline/header decoder 260 and trigger the RX-FSM 263 when a match of the incoming destination address and the node address is detected. This enables the RX-FSM 263 to copy the payload into the corresponding receiver FIFO 264 which is emptied by an upper layer mechanism. The pipeline/header decoder 260 extracts from the Start-Delimiter-ADU: slottype (isochronous, synchronous, asynchronous, command), slot status (Busy/Free, Reserved/Gratis, Priority, Synchronous Transfer) and multi-slot or single slot. From the addressing Data-ADU, it gets destination address (copy payload) and removal address (make slot free). It further keeps track of the sequences of Start-Delimiter-ADUs and End-Delimiter-ADUs according to the rules of preemption (isochronous slots) and by-passing (synchronous slots, signalling commands). In addition to these functions, the pipeline/header decoder 260 informs the TX-FSM 265 when an isochronous slots has been received. In that case, the TX-FSM 265 gets the channel identifier.

ADU Modifier Module 261

When a match between the incoming removal address and the node address is detected and at the same time the received slot header indicates that a multi-slot is now coming in, the RX-FSM 263 triggers the ADU modifier module 261 to split the multi-slot into basic-slots. All Start-Delimiter-ADUs are already available so that this module 261 just changes the first-middle-last indication into single. Moreover, the End-Delimiter-ADU is added to each basic-slot whereby this delimiter is already present in the last slot. All other 32-bit Data-ADUs are set idle. In case, the removal address does not match, the incoming ADUs (incoming slots) just are passed towards the ADU/slot dispatcher module.

ADU/slot dispatcher module

The ADU/slot dispatcher module consists of three submodules:
input part of the asynchronous slot FIFO 266,
input part of the synchronous slot FIFO 267,
input part of the signalling RX-FIFO 268.

The task of the ADU/slot dispatcher module is to separate incoming slots according to their transmission service. This is done under control of the RX-FSM 263. Slots or ADUs are either clocked into one of the FIFOs 266, 267 (synchronous or asynchronous) or are consumed (destroyed) by disabling input clocking. By the latter operation, insertion buffers are emptied. In the following situation, an arriving ADU is also not clocked into the synchronous FIFO 267. When the node has made reservation requests in the previous Reserve command, it waits for the confirm command. As soon as the Pipeline/header decoder 260 recognizes the begin of the confirmation command and the next ADU is a regular 32-bit Data-ADU, it is interpreted as the confirmation ADU awaited for or the last Data-ADU before the End-Delimiter-ADU. It is therefore clocked into the confirmation (signalling) FIFO 268 towards reservation processing. Not clocking this ADU into the synchronous FIFO 267 removes this 32-bit Data-ADU from the confirm command.

Slot and payload transmitter module

The slot and payload transmitter module multiplexes all the different data streams to be output on the outbound path 269. It includes the following submodules:
output part of the asynchronous slot FIFO 266,
output part of the synchronous slot FIFO 267,
transmitter Finite State Machine (TX-FSM) 265,
multiplexer 270,
pipeline/header decoder/translator 271,
ADU/stuffing and slot generator 272,
multiplexer 273,
output part of payload TX-FIFO 274,
output part of signalling TX-FIFO 275,
isochronous channel by-pass 276.

The central logic controlling the output of a node is located in the transmitter FSM (TX-FSM) 265. This FSM 265 gets additional information from the payload receiver module on the arrival of an isochronous slot. In case of the reception of an isochronous slot, the TX-FSM 265 controls all the other modules such that the incoming isochronous slot is directly transferred and output via multiplexer 273. Simultaneously, the channel identifier triggers the TX-FSM 265 to control the transmission/insertion of isochronous payload data into the isochronous slot. While transmitting a received isochronous slot, all other transmission activities inside the slot and payload transmitter module are temporarily halted in a controlled fashion (freeze the state, save FSM state attributes etc.). The transmission of an isochronous slot can thus start at any ADU boundary just by controlling multiplexer 273. As already described previously, this mode of operation leads to the effect that isochronous slots is embedded at any place inside a synchronous or asynchronous slot as well as a signalling command.

If no isochronous slot must be transmitted, the node is able to transmit either a synchronous or an asynchronous slot. First, all synchronous slots are transmitted before any asynchronous slot is taken. Synchronous slots, available in the synchronous FIFO 267, are clocked out and pass via multiplexer 270 the pipeline/header decoder/translator 271. Depending on the states of the slot and the node (access protocol rules), the slot control part of the Start-Delimiter-ADU is linear modified (straight forward translation). Payload gets inserted from the correspondent payload FIFO 274 into a free slot via multiplexer 273. The slot generator 272 is required when new slots have to be generated during a frame transmission while arriving busy slots are buffered into one of the insertion buffers 266, 267 (synchronous or asynchronous FIFO).

The Reserve and Confirm command is treated in the node like a synchronous slot. With this, the commands are input by the ADU/slot dispatcher module (after having modified the confirmation command if required) into the synchronous FIFO 267. After clocking out of that FIFO 267 the reservation command gets decoded in the pipeline/header decoder/translator 271. In case of a reservation waiting for transmission, the TX-FSM 265 controls the insertion of the correspondent 32-bit Data-ADU in the reservation command such that it freezes for one clock cycle the output of the synchronous FIFO 267 while inserting the appropriate ADU via multiplexer 273.

Reservation processing module 262

The reservation processing module 262 constitutes the overall MAC-protocol logic. It interacts with the higher layers of the node and keeps track of the whole reservation processing. In C-CRMA (European patent application 91810224.5), this includes handling of the number of confirmed slots, as well as preparation of new reservation data for the next Reserve command. Based on this information, the reservation processing module 262 closely interacts with the TX-FSM 265.

Generic scheduler function

Figure 28:
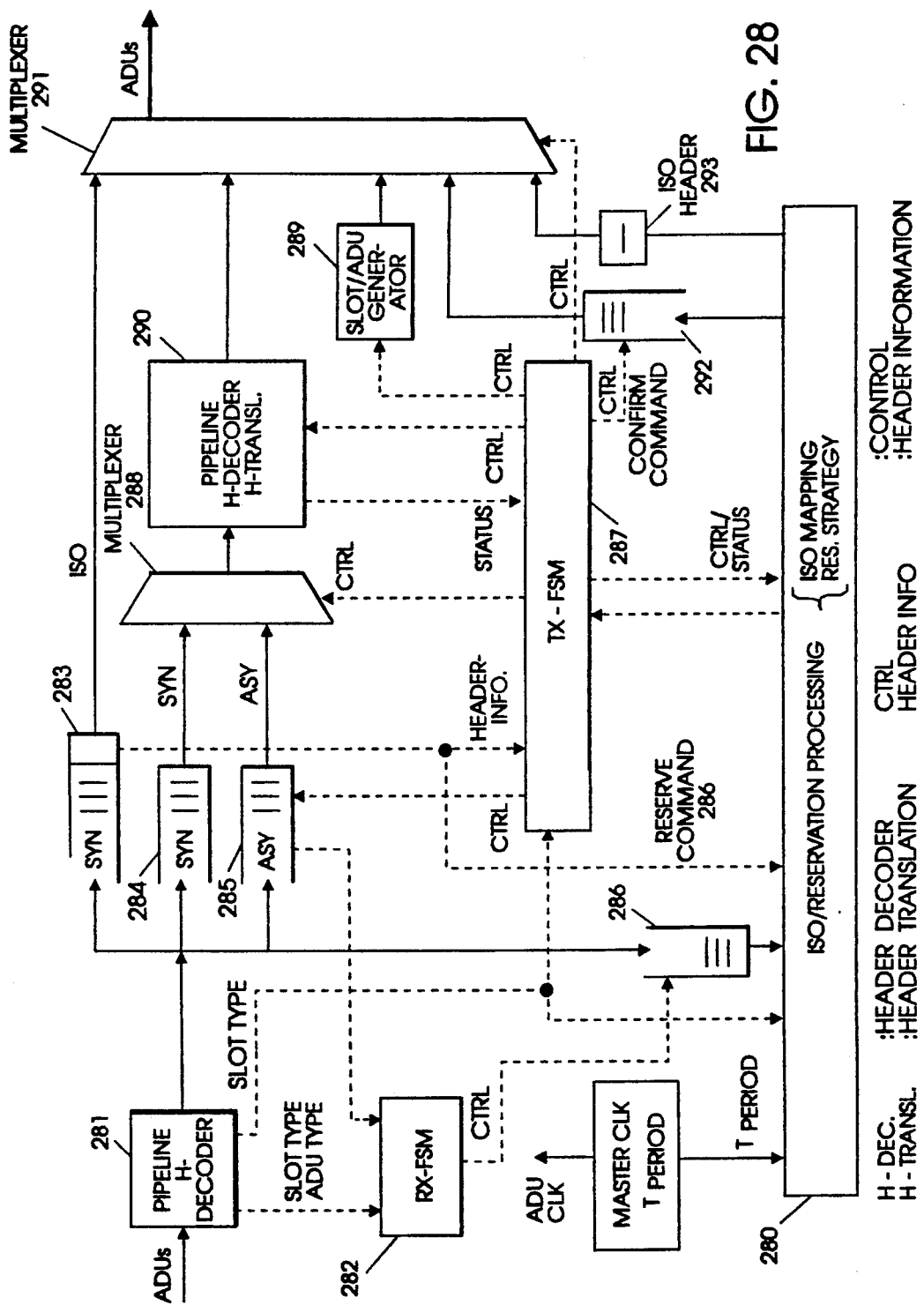
FIG. 28 shows the generic structure of a scheduler according to the present invention.

The generic structure of the scheduler function supporting all facilities as described in this patent application is shown in FIG. 28. It can be thought of being organized in three modules:
signalling receiver and ADU/slot dispatcher,
slot, payload and signalling transmitter,
isochronous mapping and reservation processing 280.

In the following, these modules are described in more detail whereby for clarity partially overlapping functionalities are kept separate.

Signalling receiver and ADU/slot dispatcher module

For the pure scheduler function as shown in FIG. 28, there is no need to receive payload information out of a regular slot. Therefore, it includes the following submodules:
pipeline/header decoder 281,
receiver Finite State Machine (RX-FSM) 282,
input part of the isochronous slot FIFO 283,
input part of the synchronous slot FIFO 284,
input part of the asynchronous slot FIFO 285,
input part of the signalling RX-FIFO 286.

The task of the signalling receiver and ADU/slot dispatcher module is to extract received Reserve commands coming back and to forward regular slots to the slot, payload and signalling transmitter module. Incoming ADUs are clocked through the pipeline/header decoder 281. Dependent on what kind of ADU/slot is received, the RX-FSM 282 of the scheduler puts the ADU/slot into the appropriate FIFO 283–285 (isochronous, synchronous or asynchronous). In case of receiving a Reserve command, the reservation ADUs are put into the signalling RX-FIFO 286 towards the isochronous mapping and reservation processing module.

Slot, payload and signalling transmitter module

Under the control of the TX-FSM 287, this part of the scheduler generates initial slots, determines the framing period by issuing Isochronous-Clock-ADUs, forwards isochronous slots in a time-controlled manner, forwards synchronous and asynchronous slots according to the occupancy in the corresponding FIFOs 284, 285, inserts payload into free slots, and issues commands. For this, it includes the following submodules:
output part of the isochronous slot FIFO 283,
output part of the synchronous slot FIFO 284,
output part of the asynchronous slot FIFO 285,
transmitter Finite State Machine (TX-FSM) 287,
multiplexer 288,
ADU/stuffing and slot generator 289,
pipeline/header decoder/translator 290,
multiplexer 291,
output part the signalling TX-FIFO 292,
output part the isochronous channel identifier FIFO/register 293.

Reconfiguration and ring initialization

During power up and reconfiguration where the scheduler starts its operation, the ADU/stuffing and slot generator 289 generates new slots until a specific maintenance and synchronization information carried by a specific slot (either in the header or in the payload) is received again by the scheduler. The specific bit pattern of the SDEL allows synchronization of the PLL, 8B/10B codewords and slot boundary. This is decoded by the pipeline/header decoder 281 inside the signalling receiver and ADU/slot dispatcher module and is reported to the TX-FSM 287 and the isochronous mapping and reservation processing module 280. With this, the scheduler determines the integer number of isochronous timer intervals $N_P$ representing the ring latency in framing periods for isochronous slots. Now the slot generation of the ADU/stuffing and slot generator 289 is stopped and normal operation starts. In case that this stopping is delayed for a certain amount of time and that meanwhile the incoming slots are buffered in the asynchronous FIFO 285, the scheduler can extend the minimal asynchronous ring latency to some required higher value. This principle of having adjustable ring latencies also applies to the latencies for synchronous and isochronous slots, where the delay is set-up by a delayed read out of the FIFOs (in case of isochronous slots, these adjustment must be done in time intervals quantities equal to the isochronous time interval).

To avoid uncontrolled access by the nodes during reconfiguration and ring initialization phases, one of the possible scenarios could be to mark every slot generated during this period as asynchronous free reserved (priority is not significant). Because no confirmations have been made so far, none of the nodes will use these slots (assuming the nodes know about the reconfiguration either by themselves or they get informed be the new scheduler with a special maintenance command). Having closed the ring logically as described above, all reserved slots passing the scheduler are now marked as asynchronous free gratis until the first slot marked gratis is passing the scheduler again. This time instant indicates that all former reserved slots have been removed from the ring and only gratis slots will circulate further. Now normal reservation and confirmation processing as well as allocating isochronous slots is enabled.

Operation on isochronous slots

The generation of slots by the scheduler is primarily given by the isochronous time interval (framing period) as described in context with FIG. 11. As shown in that figure, the scheduler starts first by issuing an Isochronous-clock-ADU generated by the ADU/stuffing and slot generator 289 to provide an isochronous time interval. After that, synchronous slots or asynchronous slots are taken out of the synchronous or asynchronous FIFO 284, 285 and transmitted as long as no isochronous slot must be transmitted. The time instant an isochronous slot must be transmitted is provided by the isochronous mapping and reservation processing module 280 and triggers the TX-FSM 287 either to transmit the slot at the top of the isochronous FIFO 283 or to generate a new isochronous slot. In case of a new isochronous slot, the isochronous mapping and reservation processing module 280 provides simultaneously the new channel identifier via the isochronous channel identifier FIFO/register 293. It is inserted into the newly generated slot header by controlling multiplexer 291. Again, it must be noted, that the transmission of an isochronous slot has highest priority and interrupts anything else. With this, even at the scheduler the begin of an isochronous slot can be at any ADU boundary inside a synchronous or asynchronous slot. As described, the framing period (isochronous time interval) $T_P$ and the number of basic-slots $N_s$ inside this interval is given by the customer, and is normally 125 μs.

Operations on synchronous and asynchronous slots

Controlled by the TX-FSM 287, synchronous and asynchronous slots (in this order) are clocked out of the correspondent FIFOs 284, 285 as long as no isochronous slot must be transmitted and as long as no signalling command is inserted via the multiplexer 288 into the outbound path. The slots pass the pipeline/header decoder/translator 290 where the appropriate setting and translation of the slot control bits (gratis/reserved, priority, monitor etc.) is done and are finally output via multiplexer 288. Signalling commands have their own Start-Delimiter-ADU and End-Delimiter-ADU so that the scheduler (TX-FSM) 287 can issue the signalling command whenever no synchronous slot is currently in transmission. This is done by the TX-FSM 287 controlling multiplexer 288 and clocking out the data from the signalling RX-FIFO 282 while freezing the clocking for the output of the asynchronous and synchronous FIFOs 285, 284. Both these FIFOs 284, 285 must be halted in this case, because in the nodes the signalling commands are processed via the synchronous data path. With this, signalling commands can be output at any asynchronous ADU boundary or at any synchronous basic-slot boundary (a signalling command can be embedded into a synchronous multi-slot).

Isochronous mapping and reservation processing module

The isochronous mapping and reservation processing module 280 holds all information required for bandwidth management for either isochronous or synchronous slots. Further, it includes the scheduler reservation processing and functionality as it is described in the European patent application 91810224.5, "Medium Access Technique for LAN Systems".

Integrated node/scheduler structure

Figure 29:
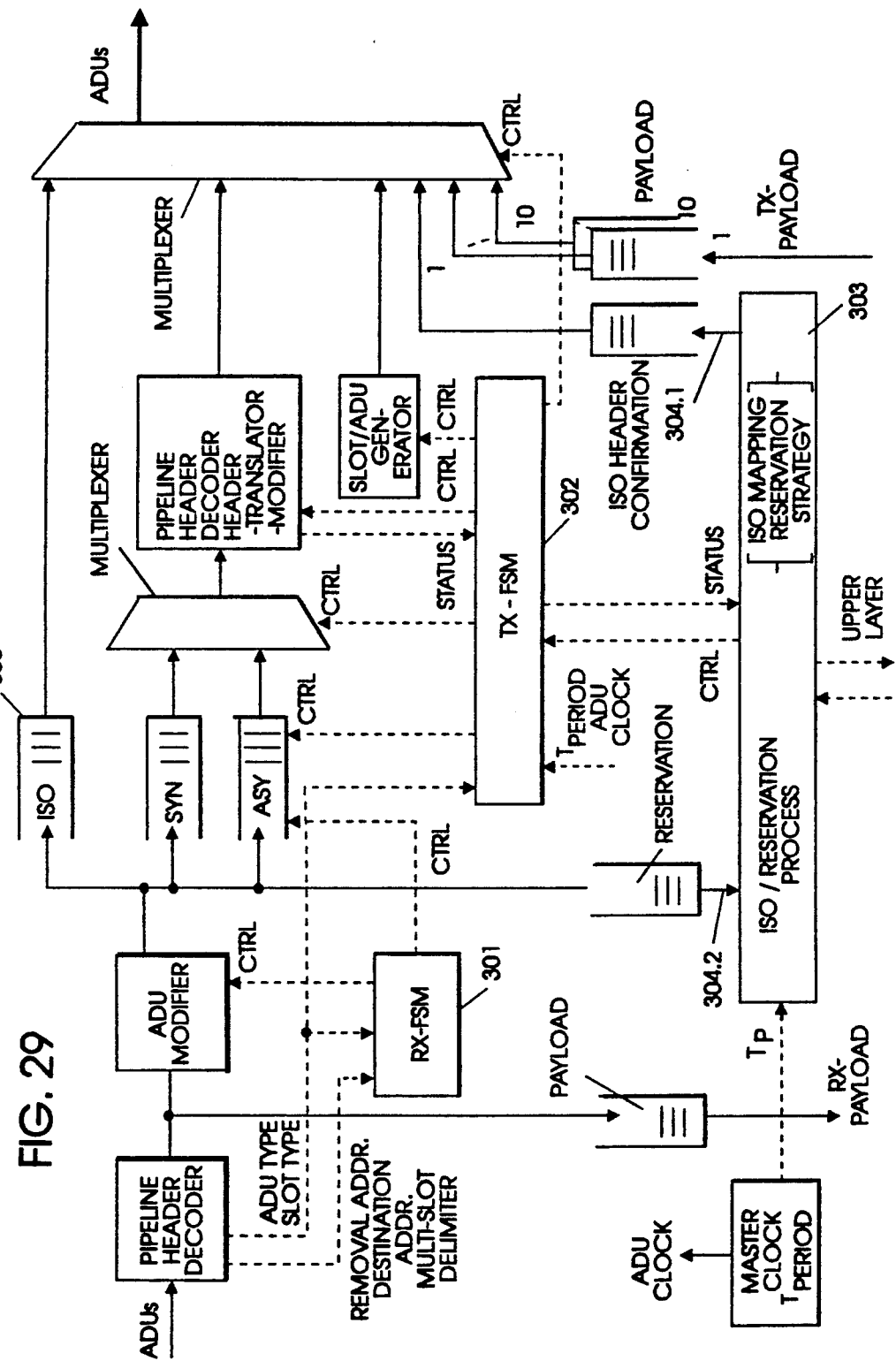
FIG. 29 shows the generic structure of an integrated node/scheduler according to the present invention.

FIG. 29 shows the integration of a node structure and a scheduler function. Comparing the node structure (FIG. 27) and the scheduler function (FIG. 28), one recognizes that a marginal hardware addition is required to obtain an integrated node/scheduler structure. This additional hardware is the isochronous FIFO 300 used in the scheduler to adjust the ring latency for isochronous slots in order to obtain an integer number of framing periods, some extension in the state space of the individual RX 301 and TX-FSMs 302.

All the other modules and hardware components required by the scheduler are already available in a node. Focusing on the isochronous mapping and reservation processing module 303, it can be seen, that in the combined solution the two signalling data paths 304.1, 304.2 going to and coming from this module can be independently overlaid and that the isochronous FIFO/register 300 can be merged, too. Looking to the FSMs 301, 302, there is no conflict in operating these FSMs simultaneously for the node and scheduler operation. This is due to the fact, that the single tasks and data operation/manipulations (being performed either by the scheduler or by a node) do not overlap. Thus, phases with only scheduler operations and phases with only node operations are sequential and do not coincide. With this, nodes include almost all facilities to perform scheduler operations.

Features of the inventive system

The main features of this flexible and self-adaptive data transmission method are summarized as follows.

The self-adaptive transmission method permits an economic, flexible and bandwidth efficient integration of different traffic characteristics in each of the three traffic types: isochronous, synchronous and asynchronous. Isochronous channels (circuit-switched channels) obey strict time relationships. Synchronous traffic is intended for time-sensitive connections like interactive packetized voice and video. This mode of operation needs a play-out buffer at the receiver to compensate end-to-end delay variations. All other traffic is asynchronous.

All three traffic types (isochronous, synchronous and asynchronous) traffic generally experience different network latencies because of a hierarchical by-pass structure in each node. The same structure is applied to the elasticity buffer in the scheduler of a ring. Further features are:

Selection of slot-unit size and framing period at start-up time,

Support of dynamic signalling with on-demand bandwidth allocation,

Transmission robustness through frequent synchronization points and transmission entity embedding by start and End-Delimiter, During each transmission autonomous slot concatenation adapts to actual frame size (in slot-size units up to selected bound).

Isochronous transmission service

Isochronous channels can freely be allocated. Freedom comprises position within framing period, size and rate. Avoiding a hybrid frame structure with a movable boundary reduces channel set-up time, eliminates organization and communication overhead to move the boundary and to do channel rearrangements, and avoids throughput wastage.

Time controlled insertion of new isochronous slots at the scheduler guarantees (also on a ring) that slots needed for a new isochronous channel are always free and therefore immediately available.

Owing to the insertion mechanism at scheduler and nodes, isochronous channels can temporarily be deactivated and are (also on a ring) immediate available when again needed.

Synchronous and asynchronous transmission service

Owing to the by-pass mechanism in the nodes (introduced in European patent application 90810456.5, "Broadband Ring Communication System And Access Control Method") where on an buffer insertion LAN synchronous slot by-pass asynchronous on boundaries, requirements for time-sensitive connections are not affected by the asynchronous transmission service.

Signalling

Dynamic signalling where and when needed.

"Low-level" congestion control to prevent receiver buffer overflow

Efficient signalling transmission service for very small messages like stand-alone acknowledgements.

System structure

The scheduler function is an integrated part of the node and needs no extra hardware except for some additional state space in the FSM and the FIFO for the isochronous slots.

The buffered data path separation in each node permits the realization of three independent transmission services: isochronous, synchronous and asynchronous. On an insertion ring, the transmission entities of these three traffic classes experience different latencies. The separated organization of the elasticity buffer (existing only in the scheduler) is only logically present and is part of the separated physical buffers in the hosted node.

Operation

The self-adaptive strategy makes most of the organization and communication overhead superfluous. And on top, the inherently distributed actions are done more efficient.

There are no parameters that depend on network latency.

Performance

The transmission data-structure adapts autonomously towards minimal transmission overhead, maximal bandwidth efficiency and optimal bandwidth sharing among the three transmission services.

Isochronous slot insertion minimizes delay to set-up or activate isochronous channels.

Error recovery

Transmission robustness through frequent synchronization points and transmission entities embedded by Start and End-Delimiters.

We claim:

1. Data transmission method for different classes of traffic with different synchronization and/or delay requirements (multi-media communication), in a network comprising stations and interconnection media which carries information organized into slots of constant size and with predefined framing periods for circuit-switched (CS) transmission, said media carrying asynchronous, synchronous, and circuit-switched slots and signalling traffic, comprising the following steps:

for asynchronous traffic (delay insensitive data traffic) embedding said asynchronous slots between a start-end delimiter pair characterizing and controlling said asynchronous traffic and indicating an address, and, if required, using a first insertion buffer means for delaying or bypassing said synchronous slots in said stations, for synchronous traffic (delay sensitive data traffic) embedding said synchronous slots between a start-/end delimiter pair characterizing and controlling said synchronous traffic and indicating an address, and, if required, using a second insertion buffer means for delaying or bypassing said synchronous slots in said stations, for signalling traffic, which is inserted on demand, embedding signalling slots between a start/end delimiter pair characterizing and controlling the type of signalling and indicating an address, and delaying or bypassing it, if required, by using a third insertion buffer means, for circuit-switched traffic embedding circuit-switched slots, having individual channel sizes, between a start/end delimiter pair characterizing and controlling said circuit-switched traffic and containing a channel identifier, said circuit-switched slots being released instantaneously in every framing period by any of the stations as at a free allocatable position, and bypassing said first, second and third insertion buffer means, such that said circuit-switched traffic is transmitted in said free allocated position, fixed during at least one framing period, and permeated by asynchronous, synchronous and signalling traffic, and that the asynchronous, synchronous and signalling traffic are delayed or bypassed in accordance to a given hierarchy, and that the transmission of traffic is adapted to the current traffic demand by dynamic allocation among said asynchronous, synchronous and signalling traffic.

2. The method of claim 1, wherein new circuit-switched slots are generated by a scheduler at connection set-up and inserted into the information stream carried on said media by allocating it into a position depending on a current circuit-switched traffic on said media by delaying or removing asynchronous or synchronous slots and delaying already existing circuit-switched slots.

3. The method of claim 1 or 2, wherein circuit-switched slots waiting for transmission in said scheduler, are inserted again into said media by delaying removing asynchronous and synchronous slots.

4. The method of claim 1 or 2, wherein already existing circuit-switched slots are removed from said media by inserting asynchronous and synchronous slots.

5. The method of claim 1 or 2, wherein insertion of circuit-switched slots is compensated by a complementary removal process of asynchronous and synchronous slots, providing for constant ring latencies.

6. The method of claim 1, wherein said network is a LAN (Local Area Network) with ring topology.

7. The method of claim 1, wherein said network is a LAN with bus topology.

8. The method of claim 1, wherein said predefined framing periods has the length of about 125 $\mu$s according to a sample rate of about 8 kHz.

9. The method of claims 6 or 7 or 8, wherein said network has a latency according to N times 125 $\mu$s framing period for circuit-switched transmission, with N being an integer number greater than zero.

10. The method of claim 1, wherein several of said slots (50; 64) are converted into multi-slots (52; 63.1, 63.2) at a source station (61) and divided again into said slots (64) in the same or another station (62).

11. The method of claim 10, wherein each said multi-slot (52) is embedded between a start/end delimiter pair and each of said former slots (50) in said multi-slot (52) is preceeded by a synchronization header (53).

12. The method of claim 2, wherein said asynchronous traffic has the lowest level in said hierarchy, followed by synchronous and circuit-switched traffic such, that said circuit-switched traffic may by-pass said asynchronous and synchronous traffic, and said synchronous traffic may by-pass said asynchronous traffic.

13. The method of claim 12, wherein by-passing takes place on slot boundaries.

14. The method of claim 1, wherein said start delimiter is a start-delimiter Atomic-Data-Unit (ADU; 165) comprising at least a start delimiter control codeword (SDEL; 160), a slot type-(170), a busy/free (173), and a priority-indicator (171).

15. The method of claim 1, wherein said end delimiter is a end-delimiter Atomic-Data-Unit (ADU; 166) comprising at least an end delimiter control codeword (EDEL; 161), a slot type-(170), and a priority-indicator (171).

16. Network for the transmission of different classes of traffic with different synchronization and/or delay requirements (multi-media communication network), comprising stations (e.g. PCs, Hosts, telephones, telefax, . . . ) and interconnection media with slots of constant size and predefined framing periods, in particular 125 $\mu$s periods for circuit-switched (CS) transmission, one of said stations operating as a scheduler, all stations comprising:
  decoder means coupled to said interconnection media for recognizing to which class of traffic the following slot belongs, and for recognizing if the following slots are integrated into a multi-slot,
  payload receiver means (98) coupled to said decoder means for removing payload from said interconnection media if said decoder means recognizes that this station is the addressee,
  basic-slot regenerator means (95) having an input coupled to said decoder means and an output for regenerating multi-slots into slots (basic-slots),
  bypass means, coupled to said output, for circuit-switched traffic,
  delay means (92), coupled to said output, for asynchronous traffic,
  delay means (91), coupled to said output, for synchronous traffic,
  payload transmitter means for sending payload,
  multiplexing means (93), coupled to the bypass means, the delay means, the payload transmitter means and the interconnection media, for integrating by-passed circuit-switched, asynchronous, synchronous, and payload traffic into said interconnection media
  control means, coupled to said bypass means, delay means, payload transmitter means and multiplexing means, for organizing transmission and bypass-/delay with regard to a given hierarchy,
said station operating as a scheduler (100) further comprising:
  delay means for circuit-switched traffic (101), being inserted into said bypass means for circuit-switched traffic,
  slot/ADU (Atomic-Data-Unit) generator means (105), coupled to said multiplexing means, for the generation of new slots.

17. The network of claim 16, wherein more than one station comprises the additional parts of said scheduler, and one of these stations is operated as scheduler.

18. Network for the transmission of different classes of traffic with different synchronization and/or delay requirements (multi-media communication network), comprising stations (e.g. PCs, Hosts, telephones, telefax, . . . ) and interconnection media with slots of constant size and predefined framing periods, in particular 125 $\mu$s periods for circuit-switched (CS) transmission, at least one of said stations comprising:
  decoder means for recognizing if this station is the addressee, for recognizing to which class of traffic the following slot belongs, and for recognizing if the following slots are integrated into a multi-slot,
  payload receiver means (98) for removing payload from said interconnection media if said decoder means recognizes that this station is the addressee,
  basic-slot regenerator means (95) for regenerating multi-slots into slots (basic-slots),
  bypass means for circuit-switched traffic,
  delay means (92) for asynchronous traffic,
  delay means (91) for synchronous traffic,
  payload transmitter means for sending payload,
  multiplexing means (93) for integrating by-passed circuit-switched, asynchronous, synchronous, and payload traffic into said interconnection media, and
  control means for organizing transmission and bypass/delay with regard to a given hierarchy.

* * * * *